United States Patent [19]

Nakajima et al.

[11] Patent Number: 5,139,791
[45] Date of Patent: Aug. 18, 1992

[54] FEEDING STIMULATORS FOR FISHES AND SHELLFISHES, AND FEED

[75] Inventors: Kenji Nakajima, 227-3, Azaokamoto, Hirano, Kawanishi-shi, Hyogo-ken, Japan; Jin-ichi Itoh, Tokyo, Japan

[73] Assignee: Kenji Nakajima, Kawanishi, Japan

[21] Appl. No.: 271,236

[22] Filed: Nov. 14, 1988

[30] Foreign Application Priority Data

| Feb. 9, 1988 | [JP] | Japan | 63-28503 |
| Apr. 19, 1988 | [JP] | Japan | 63-96496 |
| Aug. 3, 1988 | [JP] | Japan | 63-194216 |
| Aug. 3, 1988 | [JP] | Japan | 63-194217 |

[51] Int. Cl.$^5$ .............. A23L 1/00; A01N 25/00
[52] U.S. Cl. .............. 426/2; 426/1; 426/72; 424/84; 514/557
[58] Field of Search .............. 514/557; 424/84; 426/1, 426/2, 72

[56] References Cited

U.S. PATENT DOCUMENTS 4,693,897 9/1987 Johnsen et al. .............. 426/2

FOREIGN PATENT DOCUMENTS 63-146758 6/1988 Japan.
63-192350 8/1988 Japan.

OTHER PUBLICATIONS

Kiene et al. "Demethylation of Dimethylsulfoniopropionate" CA: 109(22) 196617 (1988).
Blunden et al. "NMR Spectra of Betaines . . . " CA: 106(21) 17658 (1987).
Harada et al. "Studies on the Feeding . . . " CA: 101(3) 22392, 22393 (1984).
Katsushiko Harada et al., "Feeding Attractants in Chemical of Lake Prawn for Oriental Weatherfish," *Bulletin of the Japanese Society of Scientific Fisheries*, 50 (4), 617-622 (1984).
Katsuhiko Harada et al., "Feeding Attractants in Chemical Constituents from the Mid-Gut Gland of Squid for Juvenile Yellowtail," *Bulletin of the Japanese Society of Scientific Fisheries*, 50 (4), 623-626 (1984).
Ronald P. Kiene et al., "Demethylation of Dimethylsulfoniopropionate and Production of Thiols in Anoxic Marine Sediments," *Applied and Environmental Microbiology*, Sep. 1988, pp. 2208-2212.
Tadashi Yanagisawa et al., "Properties and Functions of Yellowtail Plasma Albumins," *Bulletins of the Japanese Society of Scientific Fisheries*, 50 (4), 627-633 (1984).

*Primary Examiner*—C. Warren Ivy
*Assistant Examiner*—Celia Chang
*Attorney, Agent, or Firm*—Frishauf, Holtz, Goodman & Woodward

[57] ABSTRACT

The present invention provides a feeding stimulator for fishes and shellfishes, selected from the group consisting of dimethyl-$\beta$-propiothetin and certain compounds related thereto or salts thereof, and a feed to which this feeding stimulator has been added. The above feeding stimulator has the action of stimulating gustatory sense or olfactory sense of fishes or shellfishes to promote their appetites. Hence, employment of a feed to which this feeding stimulator has been added enables enhancement of feed efficiency in aquaculture or the like of fishes and shellfishes. Also, even when a substitute feed available in a low cost is used, it becomes possible to maintain the same feed efficiency as the mixed feeds in which raw feeds and fish powder are used.

34 Claims, 10 Drawing Sheets

└─────────┘ : CLEARLY ACTIVATED REGION

FEEDING STIMULATORS FOR FISHES AND SHELLFISHES, AND FEED

BACKGROUND OF THE INVENTION

1. Field of the Invention

The present invention relates to a feeding stimulator for fishes and shellfishes, that can increase feed consumption of fishes and shellfishes and results in growth promotion thereof, and a feed (including a bait) containing the stimulator.

2. Background Information

In recent years, overfishing of fishery resources has caused world-wide problems, and 200 nautical mile fishery rights have been established to protect the fishery resources in every country. Under such circumstances, hauls of adjacent sea surface fishes or cultured fishes tend to increase year by year.

However, for the breeding of the adjacent sea surface fishes or cultured fishes, raw feeds and fish powder are fed in the sea in such a large quantity that the feeds that have not been taken by fishes settle on the sea floor to cause contamination of a continental shelf. A low effective utilization of feeds also causes an increase in cost.

For this reason, aquaculture industries have desired the development of a feed that can achieve a high feed efficiency and a low cost, more specifically, a substitute feed that can maintain the same feed efficiency as in the mixed feeds in which the raw feeds and fish powder are used.

As one of researches for such purposes, reports have been made on feeding stimulators that stimulate the olfactory sense or gustatory sense of fishes to urge them to take feeds. Glutamine is known as a typical example thereof, but, under the existing conditions, no remarkable effect can be obtained when it is mixed in feeds.

SUMMARY OF THE INVENTION

An object of the present invention is to provide a feeding stimulator for fishes and shellfishes that stimulates the gustatory sense or olfactory sense of fishes and shellfishes to enhance the feed efficiency, and a feed containing the same.

To achieve the above object, the feeding stimulator for fishes and shellfishes according to the present invention is characterized by comprising at least one selected from the compounds, or salts thereof, represented respectively by the following Formulas (I) to (VI):

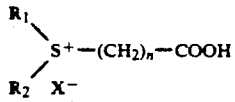
(I)

wherein $R_1$ and $R_2$ may be the same or different and each represent a hydrogen atom, an oxygen atom, a halogen atom, a saturated hydrocarbon group, a saturated heterocyclic group, an unsaturated hydrocarbon group, an unsaturated heterocyclic group, a carboxy group, a thiocarboxy group, a dithiocarboxy group, a sulfo group, a sulfino group, a sulfeno group, a haloformyl group, a carbamoyl group, a hydrazinocarbonyl group, a cyano group, a nitrilo group, an isocyano group, a cyanato group, a thiocyanato group, an isothiocyanato group, a thioketone group, a formyl group, an oxo group, a thioformyl group, a thioxo group, a hydroxy group, a mercapto group, a hydroperoxy group, an amino group, an imino group, a hydrazino group, a nitro group, a nitroso group, a diazo group, an azido group, an alkyloxy group, an alkylthio group, an alkyldioxy group, an alkyloxycarbonyl group, a dithio group, a trithio group, a polythio group, or a composite group of any of these; $X^-$ represents a monovalent anion; and n is an integer of $0 \leq n \leq 20$.

(II)

wherein $R_1$, $R_2$ and $X^-$ are the same as defined above; and $R_3$ represents a group having $-(CH_2)_n-$ as a basic skeleton, to one or more of carbon atoms of which the group(s) same as $R_1$ and $R_2$ is/are bonded or one or more of carbon atoms of which undergo/undergoes dehydrogenation to form one or more of double bonds or triple bonds.

(III)

wherein $R_1$, $R_2$, $X^-$ and n are the same as defined above; and $R^4$ is the same as defined for the above $R_1$ and $R_2$.

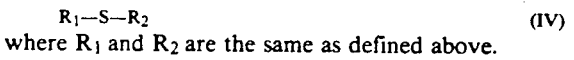
(IV)

where $R_1$ and $R_2$ are the same as defined above.

(V)

where $R_1$ and $R_2$ are the same as defined above; and m is an integer of 1 to 4.

(VI)

wherein $X^-$ and n are the same as defined above; and $R_5$, $R_6$, $R_7$ and $R_8$ are the same as defined for the above $R_1$ and $R_2$.

The feed for fishes and shellfishes according to the present invention is characterized by a feed to which the above feeding stimulator is added.

The present invention also provides a method of using the above compound or a salt thereof as a feeding stimulator by adding it in a feed for fishes and shellfishes to increase feed efficiency.

As shown in Examples set out hereinbelow, the above feeding stimulator was confirmed to have the action of stimulating the olfactory sense or gustatory sense of fishes and shellfishes to promote the appetite of fishes and shellfishes. Accordingly, addition of this feeding stimulator enables enhancement of feed efficiency in aquaculture or the like of fishes and shellfishes. Also, even when a substitute feed available in a low cost is used, it becomes possible to maintain the same feed efficiency as the mixed feeds in which raw feeds and fish powder are used.

DESCRIPTION OF THE PREFERRED EMBODIMENTS

Figure 1:
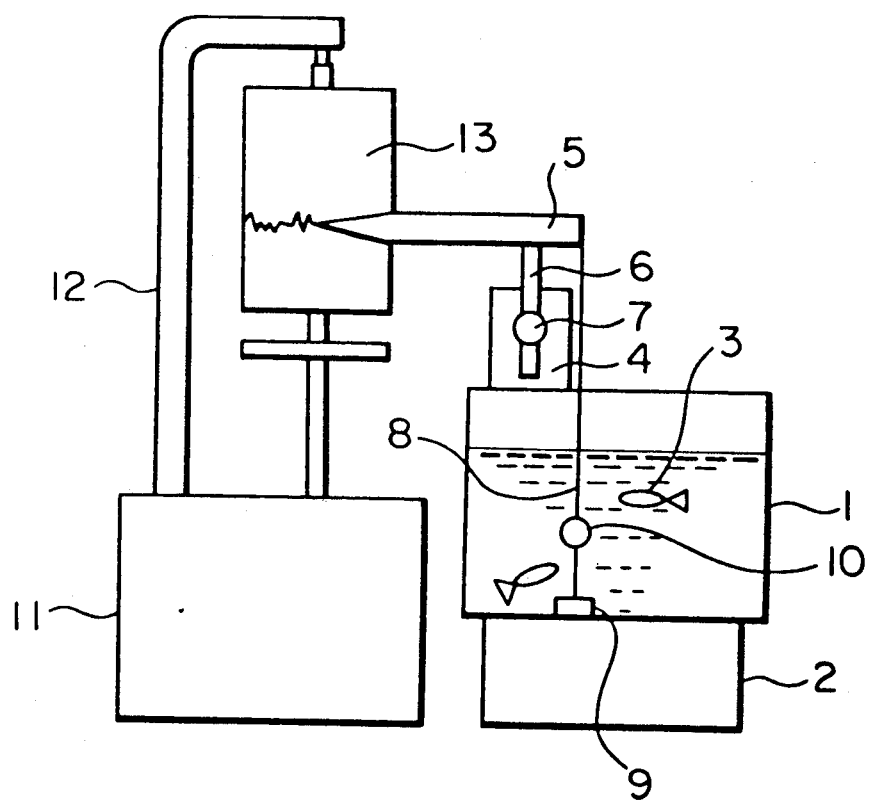
FIG. 1 is a schematic view of an equipment used in experiments for testing feeding-stimulation effect to fishes on various stimulators.

The feeding stimulator for fishes and shellfishes according to the present invention comprises at least one selected from the compounds, or salts thereof, represented respectively by the above Formulas (I) to (VI).

The compound of the above Formula (I) can be synthesized, for example, by the reaction according to the following scheme:

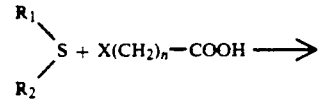

-continued

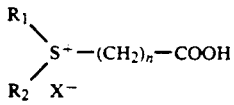

Preferred examples of the compound represented by Formula (I) may include the following:

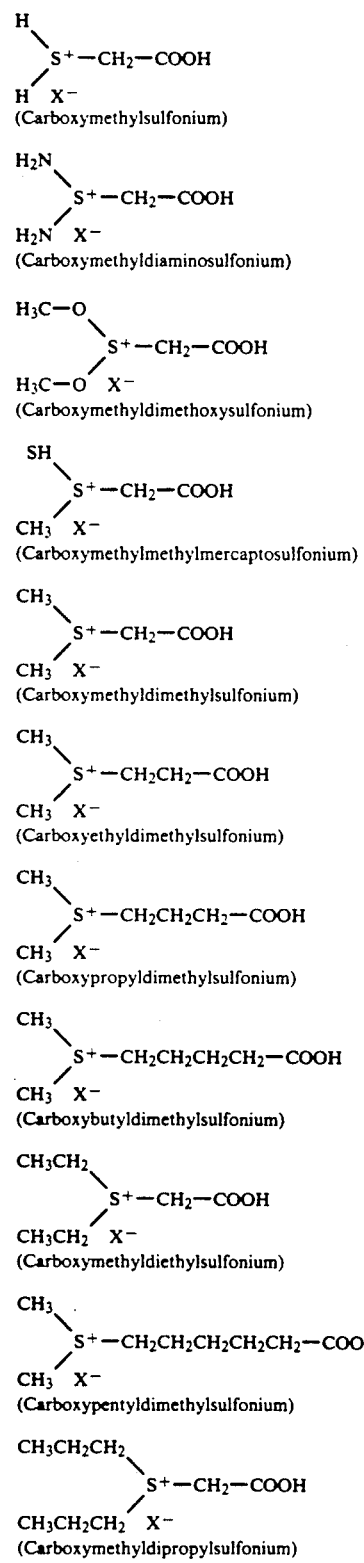

-continued

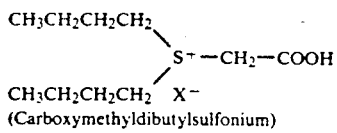
(Carboxymethyldibutylsulfonium)

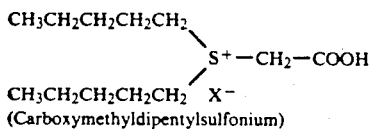
(Carboxymethyldipentylsulfonium)

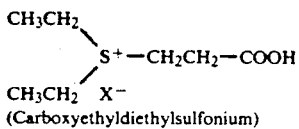
(Carboxyethyldiethylsulfonium)

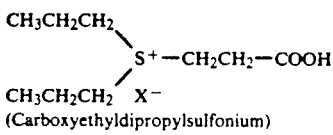
(Carboxyethyldipropylsulfonium)

The compound of the above Formula (II) can be synthesized, for example, by the reaction according to the following scheme:

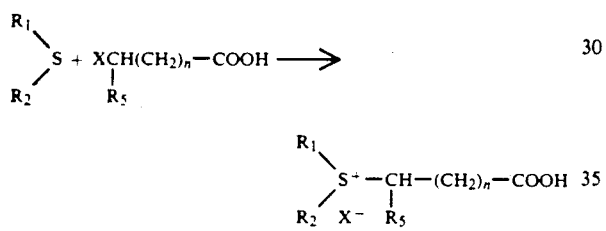

wherein $R_5$ is the same as defined for $R_1$ and $R_2$.

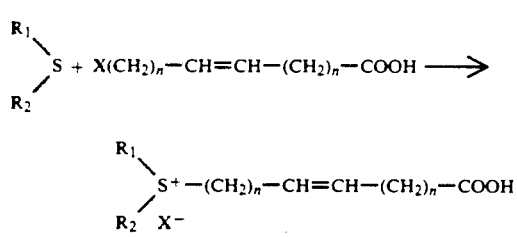

Preferred examples of the compound represented by Formula (II) may include the following:

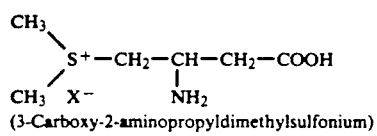
(3-Carboxy-2-aminopropyldimethylsulfonium)

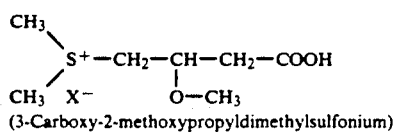
(3-Carboxy-2-methoxypropyldimethylsulfonium)

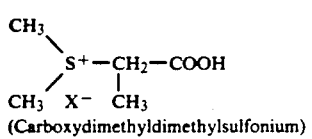
(Carboxydimethyldimethylsulfonium)

-continued

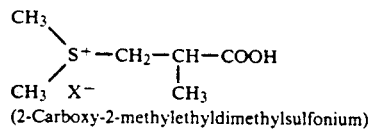
(2-Carboxy-2-methylethyldimethylsulfonium)

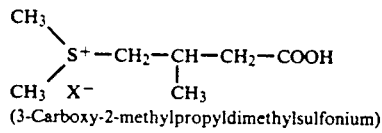
(3-Carboxy-2-methylpropyldimethylsulfonium)

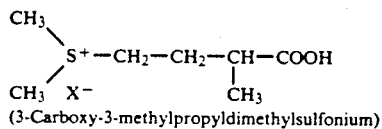
(3-Carboxy-3-methylpropyldimethylsulfonium)

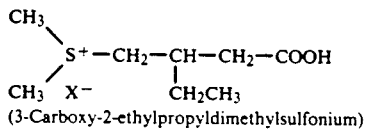
(3-Carboxy-2-ethylpropyldimethylsulfonium)

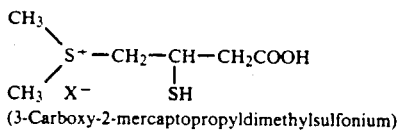
(3-Carboxy-2-mercaptopropyldimethylsulfonium)

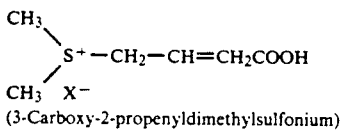
(3-Carboxy-2-propenyldimethylsulfonium)

The compound of the above Formula (III) can be synthesized, for example by the reaction according to the following scheme:

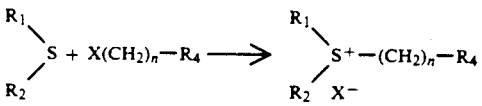

Preferred examples of the compound represented by Formula (III) may include the following:

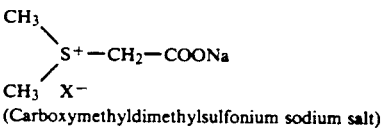
(Carboxymethyldimethylsulfonium sodium salt)

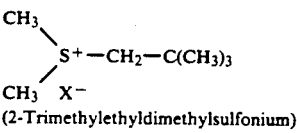
(2-Trimethylethyldimethylsulfonium)

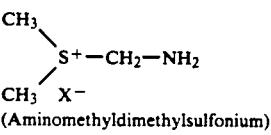
(Aminomethyldimethylsulfonium)

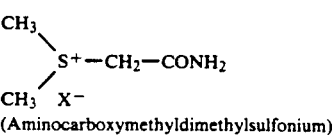
(Aminocarboxymethyldimethylsulfonium)

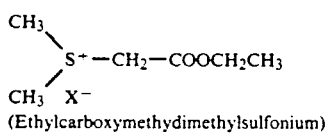
(Ethylcarboxymethydimethylsulfonium)

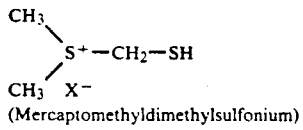
(Mercaptomethyldimethylsulfonium)

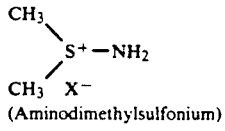
(Aminodimethylsulfonium)

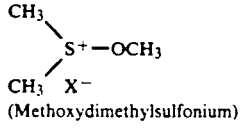
(Methoxydimethylsulfonium)

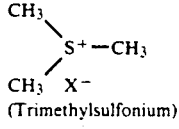
(Trimethylsulfonium)

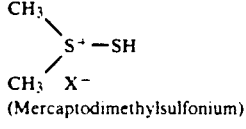
(Mercaptodimethylsulfonium)

The compound of the above Formula (IV) can be synthesized, for example, by the reaction according to the following scheme:

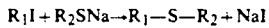

Preferred examples of the compound represented by Formula (IV) may include the following:

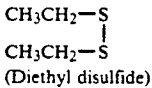
(Dimethyl sulfide)

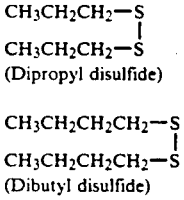
(Diethyl sulfide)

CH$_3$CH$_2$CH$_2$
            \
             S
            /
CH$_3$CH$_2$CH$_2$
(Dipropyl sulfide)

CH$_3$CH$_2$CH$_2$CH$_2$
                   \
                    S
                   /
CH$_3$CH$_2$CH$_2$CH$_2$
(Dibutyl sulfide)

CH$_3$—S
CH$_3$—S
(Dimethyl disulfide)

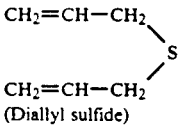
(Diethyl disulfide)

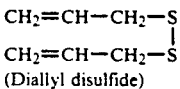
(Dipropyl disulfide)

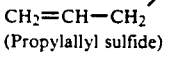
(Dibutyl disulfide)

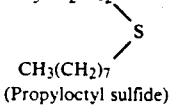
(Diallyl sulfide)

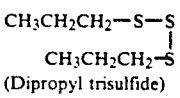
(Diallyl disulfide)

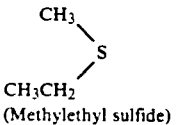
(Propylallyl sulfide)

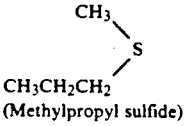
(Propyloctyl sulfide)

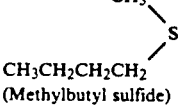
(Dipropyl trisulfide)

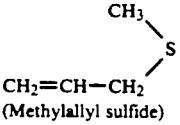
(Methylethyl sulfide)

CH$_3$
     \
      S
     /
CH$_3$CH$_2$CH$_2$
(Methylpropyl sulfide)

CH$_3$
     \
      S
     /
CH$_3$CH$_2$CH$_2$CH$_2$
(Methylbutyl sulfide)

CH$_3$
     \
      S
     /
CH$_2$=CH—CH$_2$
(Methylallyl sulfide)

(Methyl-(3-methylthio)-propanoate)

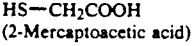
(2-Mercaptoacetic acid)

(3-Methylthiopropanoic acid)

HS—CH₂CH₂COOH
(3-Mercaptopropanoic acid)

CH₃—S—CH₂CH₂CH₂OH
(3-Methylthiopropanol)

CH₃—S—CH₂CH₂CH₂NH₂
(3-Methylthiopropylamine)

CH₃—S—CH₂CH₂CHO
(3-Methylthiopropanal)

The compound represented by Formula (V) can be prepared by oxidation of the compound represented by Formula (IV).

Preferred examples of the compound represented by Formula (V) may include the following:

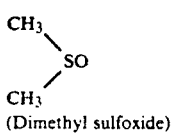
(Dimethyl sulfoxide)

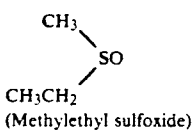
(Methylethyl sulfoxide)

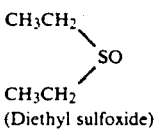
(Diethyl sulfoxide)

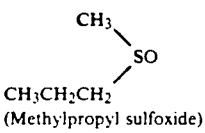
(Methylpropyl sulfoxide)

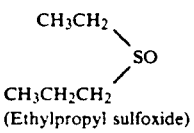
(Ethylpropyl sulfoxide)

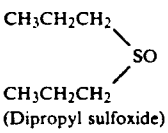
(Dipropyl sulfoxide)

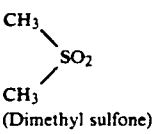
(Dimethyl sulfone)

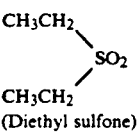
(Diethyl sulfone)

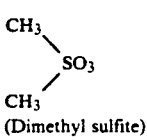
(Dimethyl sulfite)

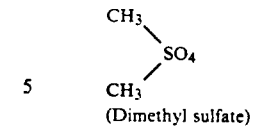
(Dimethyl sulfate)

Preferred examples of the compound represented by Formula (IV) may include the following:

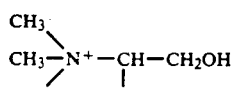
(1-Methyl-2-hydroxyethyl trimethylammonium)

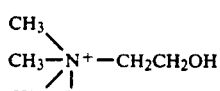
(Choline = 2-Hydroxyethyl trimethylammonium)

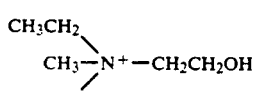
(2-Hydroxyethyl ethyldimethylammonium)

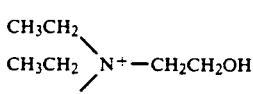
(2-Hydroxyethyl dimethylmethylammonium)

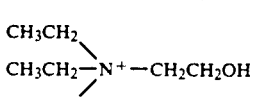
(2-Hydroxyethyl triethylammonium)

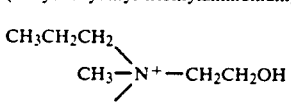
(2-Hydroxyethyl propyldimethylammonium)

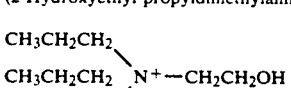
(2-Hydroxyethyl dipropylmethylammonium)

In Formulas (I), (II), (III) and (VI), n may preferably be an integer of $0 \leq n \leq 10$, and more preferably $0 \leq n \leq 5$.

In $R_1$ and $R_2$ (similarly including $R_4$, $R_5$, $R_6$, $R_7$ and $R_8$), more preferred substituents include a hydrogen atom, an oxygen atom, a halogen atom, a saturated hydrocarbon group, an unsaturated hydrocarbon group, a carboxy group, a thiocarboxy group, a dithiocarboxy group, a sulfino group, a sulfeno group, a haloformyl group, a cyanato group, a formyl group, an oxo group, a hydroxy group, a mercapto group, a hydroperoxy group, an amino group, an imino group, an alkyloxy group, an alkylthio group, an alkyldioxy group, an alkyloxycarbonyl group, a dithio group, a trithio group, a polythio group, or a composite group of any of these.

Of these compounds represented respectively by Formulas (I) to (VI), the compounds that can most strongly exhibit the feeding-stimulation effect to fishes and shellfishes are carboxyethyldimethylsulfonium (or dimethyl-β-propiothetin), carboxyethyldimethylsulfonium (or dimethylthetin), and choline.

The feeding stimulator of the present invention may be added in feeds of various types as exemplified by synthetic feeds, semi-natural feeds and wholly natural feeds, thereby bringing about the effect of increasing the feed consumption of fishes and shellfishes and promoting the growth thereof. This effect can be seen in all sorts of fishes including fresh-water fishes as exemplified by carps, crucian carps, goldfishes, eels, rainbow trouts and tilapias, and sea water fishes as exemplified by young yellowtails, sea breams, spiny lobsters and bastard halibuts. It also can be seen in all sorts of shellfishes such as top shells, abalones, oysters, common scallops, ark shells, pearl oyster shells, hard clams, surf clams and noble scallops.

The feed of the present invention is characterized by a feed to which the above feed stimulator has been added, and any synthetic feeds, semi-natural feeds and wholly natural feeds can be employed as the feed serving as a base. The feed of the present invention can be effectively used not only as feed in aquaculture of fishes and shellfishes, but also as baits in angling.

There are no particular limitations on the manner of adding the feeding stimulator, but the feed may preferably be prepared, for example, by adding a solution containing $10^{-10}$ to $10^{-1}$ M of the feeding stimulator. Here, if the concentration of the feeding stimulator in the solution is less than $10^{-10}$ M, no sufficient feeding-stimulation effect to fishes may be obtained, and if it is more than $10^{-1}$ M, a bad smell tends to be generated to lower the effect. More preferably the feed may be prepared by adding the above solution to raw materials for the feed and kneading them together.

In general, the feeding stimulator of the present invention may be so added in the feed as to be in an amount preferably of from $9.0 \times 10^{-7}$ to $3.0 \times 10^5$ ppm, and more preferably of from $1.08 \times 10^{-5}$ to $1.08 \times 10^{-4}$ ppm, based on the total weight of the feed.

The present invention will be described below in greater detail by giving Experiments and Examples.

Experiments (1) Laboratory equipment and method

FIG. 1 illustrates equipment used in experiments for testing the feeding stimulation effect on fishes of various stimulators. In the figure, the numeral 1 denotes a water tank, which is supported on a pedestal 2. Fishes 3 are put in the water tank 1. A column 4 is set up on the side of the water tank 1, and an arm 6 connected to a recording needle 5 is pivotably supported on the column 4 through a pivot 7. To the rear end of the recording needle 5, a thread 8 is connected, and a magnet 9 is fixed to the lower end of the thread, which magnet 9 comes into close contact with the bottom of the water tank, so that the thread is stretched. On the middle of the thread 8, a feed 10 used in the experiments is attached at the part immersed in the water in the water tank 1. On the other hand, a recorder main unit 11 is provided at the side of the water tank 1, and a reversed-L-shaped support is set up on the recorder main unit 11. Between the support 12 and the recorder main unit 11, a rotating drum 13 is rotatably supported, and the tip of the above recording needle 5 is slidably in contact with the rotating drum 13. The rotating drum 13 is so set as to make one revolution in 2 minutes and 50 seconds.

To describe the manner of experiments using the above described equipment, the experimental feed 10 to which various feeding stimulators are each added is prepared, which feed 10 is stuck on the thread 8 and immersed in the water tank 1 at the position of an intermediate height in the water. Then, the rotating drum 13 is revolved to record thereon the striking (or biting) of the fishes 3 on the feed 10. More specifically, when the fishes 3 strike the feed 10, the thread 8 stretched by the magnet 9 is pulled, so that the recording needle 5 vibrates to make a record on the rotating drum 13. Measured were the times the fishes 3 struck the feed 10 while the rotating drum 13 makes one revolution. The water used in the experiments was changed for each new one and at the same time the thread 8, the fishes 3 and the water tank 1 were thoroughly washed with rearing water.

(2) Preparation of feed

The experimental feed was prepared in the following manner: In regard to base feeds, cellulose powder was used as a simple synthetic feed; an equal-weight mixed feed of cellulose powder and powder of a commercially available natural solid feed for carps, as a semi-natural feed; and the above natural solid feed for carps, as an wholly natural feed. On the other hand, prepared was an aqueous solution in which a substance on which the feeding-stimulation effect is tested was dissolved in a concentration of $10^{-3}$ M. Then, 0.5 g of the above base feed was taken up and 0.8 ml of the above test solution was added therein, which were kneaded together in a mortar to prepare a feed.

Preliminary Experiment: (Test on amino acid)

First, the feeding-stimulation effect on goldfishes was measured according to the above method, in respect of several types of amino acids having been hitherto reported as substances that strongly stimulate the gustatory sense or olfactory sense of fishes and shellfishes. More specifically, each amino acid was dissolved in water in a concentration of $10^{-3}$ M to prepare a test solution, and 0.8 ml of the resulting test solution was added to 0.5 g of cellulose powder, which were kneaded together to prepare an experimental feed. The resulting feed was stuck on the thread of the equipment described above to measure the times the goldfishes struck the feed. A series of the measurements with these amino acids was repeated three times. Results obtained are as shown in Table 1.

Table 1 shows relative values based on an evaluation made by assuming as 100 the times of striking on glutamine-added feed. In Table 1, the abbreviations indicate as follows:

Gln: glutamine; Val: valine; Leu: leucine; Ser: serine; Thr: threonine; Glu: glutamic acid; Arg: arginine; and
Lys: lysine.

Table 1 shows that glutamine contributes the best feeding effect as having been hitherto reported, and glutamic acid, alginine, leucine and so forth follow in that order.

TABLE 1

| | Amino acids | | | | | | | |
|---|---|---|---|---|---|---|---|---|
| | Gln | Val | Leu | Ser | Thr | Glu | Arg | Lys |
| Relative | 100 | 22.8 | 69.8 | 55.4 | 59.1 | 72.4 | 73.6 | 49.3 |
| values | 100 | 24.7 | 61.5 | 44.5 | 59.0 | 62.0 | 77.4 | 57.1 |
| (%) | 100 | 22.6 | 61.9 | 51.1 | 56.4 | 134.5 | 81.6 | 71.6 |
| Average | 100 | 23.4 | 64.4 | 50.3 | 58.2 | 89.6 | 77.5 | 59.3 |

EXAMPLE 1

(Experiments using simple synthetic feeds)

Experiments similar to the above were carried out using several types of sulfur-containing compounds. More specifically, each substance was dissolved in water in a concentration of $10^{-3}$ M to prepare a test solution, and 0.8 ml of the resulting test solution was added to 0.5 g of cellulose powder, which were kneaded together, thus preparing experimental feeds. A feed obtained by adding 0.8 ml of water as it is, to 0.5 g of cellulose powder and kneading them together was also used as a control. These feeds were each stuck on the thread of the equipment described above to measure the times the goldfishes struck the feed. The measurement was repeated five times for each feed, an evaluation was made based on the total number of the striking times. Results obtained are as shown in Table 2. In Table 2, two kinds of values are shown for the case where water was added. This is because the corresponding measurements were respectively carried out at the beginning, and the end, of the experiments.

Table 2 confirms the fact that the effect attributable to dimethyl-β-propiothetin much exceeds the effect attributable to the glutamine having been hitherto reported as the substance that most strongly stimulates the gustatory sense or olfactory sense in every sort of freshwater fishes and sea water fishes. A good effect was also found in respect of dimethyl sulfide (corresponding to the left side of Formula (I)), the decomposition product of dimethyl-β-propiothetin.

TABLE 2

| Compound | Experiment times | | | | | Sum |
|---|---|---|---|---|---|---|
| | 1 | 2 | 3 | 4 | 5 | |
| | Striking times | | | | | |
| Water | 4 | 0 | 1 | 4 | 0 | 9 |
| Vitamin U | 5 | 3 | 2 | 2 | 4 | 16 |
| Taurine | 5 | 0 | 9 | 24 | 12 | 50 |
| Methylcysteine | 2 | 10 | 2 | 26 | 16 | 56 |
| Dimethyl sulfide | 3 | 5 | 6 | 24 | 31 | 69 |
| dimethyl-β-propiothetin | 15 | 20 | 25 | 47 | 36 | 143 |
| Dithiazine | 5 | 16 | 13 | 20 | 10 | 64 |
| Glutamine | 2 | 8 | 10 | 22 | 14 | 56 |
| Water | 2 | 12 | 13 | 11 | 21 | 59 |

Each paste was prepared by adding each test solution ($10^{-3}$M, 0.8 ml) to cellulose powder (0.5 g).

EXAMPLE 2

(Experiments using semi-natural feeds)

Next, using semi-natural feeds, experiments were carried out on dimethyl-β-propiothetin and glutamine. More specifically, to 0.5 g of an equal-weight mixed feed of cellulose powder and powder of a natural solid feed for carps, 0.8 ml of water or each test solution (dimethyl-β-propiothetin or glutamine in a concentration of $10^{-3}$ M) was added, which were kneaded together to prepare experimental feeds. A feed obtained by adding 0.8 ml of water as it is, to 0.5 g of cellulose powder and kneading them together was also used as a control. Using these feeds, the times the goldfishes struck the feeds were measured in the same manner as in Example 1. Results obtained are shown in Table 3.

Table 3 shows that the effect attributable to dimethyl-β-propiothetin is good also when the semi-natural feeds are used and, on the other hand, no effect attributable to glutamine is seen when the semi-natural feeds are used.

The feeding-stimulation effect attributable to dimethyl-β-propiothetin was also measured in the same manner as in the above except that crucian carps were used as the fishes. Results obtained are shown in Table 4.

Table 4 shows that the feeding-stimulation effect attributable to dimethyl-β-propiothetin is seen also in respect of crucial carps.

TABLE 3

| Compound | Experiment times | | | | | Sum |
|---|---|---|---|---|---|---|
| | 1 | 2 | 3 | 4 | 5 | |
| | Striking times | | | | | |
| Water* | 4 | 5 | 1 | 1 | 0 | 11 |
| Mixed feed + H₂O** | 22 | 40 | 17 | 15 | 19 | 113 |
| Mixed feed + dimethyl-β-propiothetin** | 32 | 27 | 33 | 44 | 21 | 157 |
| Mixed feed + glutamine** | 13 | 32 | 18 | 28 | 13 | 104 |
| Water | 4 | 1 | 1 | 0 | 0 | 6 |

*Prepared by adding water (0.8 ml) to cellulose powder (0.5 g).
**Prepared by adding water or each test solution ($10^{-3}$M, 0.8 ml) to an equal-weight mixed feed (0.5 g) of cellulose powder and a powdery natural feed.

TABLE 4

| Compound | Experiment times | | | | | Sum |
|---|---|---|---|---|---|---|
| | 1 | 2 | 3 | 4 | 5 | |
| | Striking times | | | | | |
| Water* | 3 | 4 | 2 | 3 | 5 | 17 |
| Mixed feed + H₂O** | 7 | 8 | 9 | 13 | 7 | 44 |
| Mixed feed + dimethyl-β-propiothetin** | 7 | 15 | 10 | 23 | 11 | 66 |
| Water | 4 | 2 | 1 | 5 | 0 | 12 |

*Prepared by adding water (0.8 ml) to cellulose powder (0.5 g).
**Prepared by adding water or each test solution ($10^{-3}$M, 0.8 ml) to an equal-weight mixed feed (0.5 g) of cellulose powder and a powdery natural feed.

EXAMPLE 3

(Experiments using natural feeds)

Nest, using natural feeds, experiments were carried out in the same manner as in Example 2. More specifically, to 0.5 g of powder or a natural solid feed for carps, 0.8 ml of water or each test solution (dimethyl-β-propiothetin in a concentration of $10^{-3}$ M) was added, which were kneaded together to prepare experimental feeds. A feed obtained by adding 0.8 ml of water as it is, to 0.5 of cellulose powder and kneading them together was also used as a control. Using these feeds, the times the goldfishes struck the feeds were measured to obtain the results shown in Table 5, and the times the crucian carps struck the feeds were measured to obtain the results shown in Table 6.

Tables 5 and 6 show that the effect attributable to dimethyl-β-propiothetin is seen also on both goldfishes and crucian carps.

TABLE 5

| Compound | Experiment times | | | | | Sum |
|---|---|---|---|---|---|---|
| | 1 | 2 | 3 | 4 | 5 | |
| | Striking times | | | | | |
| Water* | 1 | 0 | 0 | 2 | 0 | 3 |
| Natural feed + H₂O** | 41 | 30 | 18 | 43 | 18 | 150 |
| Natural feed + dimethyl-β-propiothetin** | 56 | 32 | 12 | 64 | 49 | 213 |
| Water | 1 | 0 | 0 | 0 | 0 | 1 |

*Prepared by adding water (0.8 ml) to cellulose powder (0.5 g).
**Prepared by adding 0.8 ml of water or each test solution ($10^{-3}$M) to a natural feed (0.5 g).

TABLE 6

| Compound | Experiment times | | | | | Sum |
|---|---|---|---|---|---|---|
| | 1 | 2 | 3 | 4 | 5 | |
| | Striking times | | | | | |
| Water* | 1 | 1 | 0 | 0 | 2 | 4 |
| Natural feed + $H_2O$** | 11 | 2 | 18 | 1 | 13 | 45 |
| Natural feed + dimethyl-$\beta$-propiothetin** | 15 | 6 | 24 | 7 | 8 | 60 |
| Water | 0 | 0 | 0 | 0 | 0 | 0 |

*Prepared by adding water (0.8 ml) to cellulose powder (0.5 g).
**Prepared by adding 0.8 ml of water or each test solution ($10^{-3}$M) to a natural feed (0.5 g).

EXAMPLE 4

(Experiments using a decomposition product of dimethyl-$\beta$-propiothetin)

To study the effect attributable to dimethyl-$\beta$-propiothetin, dimethyl sulfide, which is a constituent component and a decomposition product of the dimethyl-$\beta$-propiothetin, and acrylic acid were added to feeds, respectively, to measure the feeding-stimulation effect to goldfishes. Feeds used were those obtained by adding 0.8 ml of each test solution (concentration: $10^{-3}$ M) to 0.5 g of cellulose powder and kneading them together. Results obtained are shown in Table 7.

Table 7 clearly shows that the effect attributable to dimethyl-$\beta$-propiothetin is not the effect attributable to the decomposition product of this compound, since the effect attributable to dimethyl-$\beta$-propiothetin distinctly exceeds the effects obtained when both the dimethyl sulfide and acrylic acid were used alone or in combination.

TABLE 7

| Compound | Experiment times | | | | | Sum |
|---|---|---|---|---|---|---|
| | 1 | 2 | 3 | 4 | 5 | |
| | Striking times | | | | | |
| Water | 0 | 0 | 0 | 1 | 0 | 1 |
| Glutamine | 6 | 7 | 15 | 25 | 8 | 61 |
| Dimethyl-$\beta$-propiothetin | 12 | 20 | 11 | 23 | 5 | 71 |
| Dimethyl sulfide (D) | 8 | 12 | 11 | 14 | 5 | 50 |
| Acrylic acid (A) | 5 | 1 | 8 | 2 | 2 | 18 |
| (D) + (A) | 2 | 10 | 6 | 8 | 8 | 33 |

Each paste was prepared by adding 0.8 ml of water or each test solution ($10^{-3}$M) to cellulose powder (0.5 g).

The above results are concerned with goldfishes or crucian carps, but the effect attributable to dimethyl-$\beta$-propiothetin was also confirmed in instances in which other kinds of fishes were used.

EXAMPLE 5

(Rearing experiments)

To 100 g of an equal-weight mixed feed of cellulose powder and powder of a natural solid feed for carps, 160 ml of water or a test solution (dimethyl-$\beta$-propiothetin in a concentration of $10^{-3}$ M) was added, which were kneaded together to prepare experimental feeds. The resulting feeds were fed in a dose of 0.05 g per one fish to rear crucian carps for 30 days. As a result, a body weight gain was seen in 20% of the crucian carps when using the feed to which no dimethyl-$\beta$-propiothetin was added, and 50% when using the feed to which dimethyl-$\beta$-propiothetin was added. Thus, employment of the feeding stimulator of the present invention can also bring about the effect of promoting the growth of fishes.

EXAMPLE 6

(Method of measuring electrical responses from olfactory tract)

Figure 2:
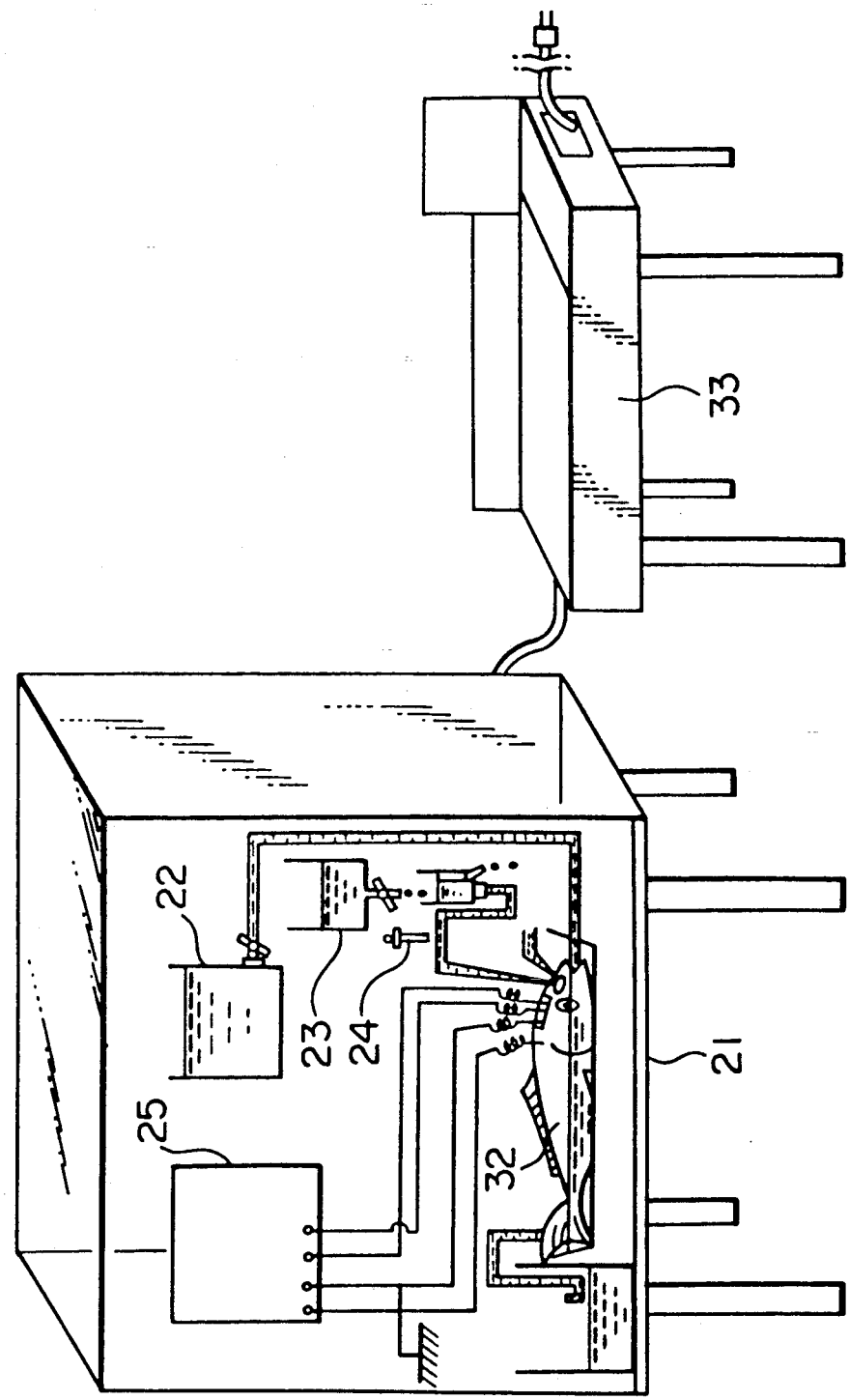
FIG. 2 is a schematic view illustrating a laboratory equipment used in measurement of an electrical response from an olfactory tract of a fish.
Figure 3:
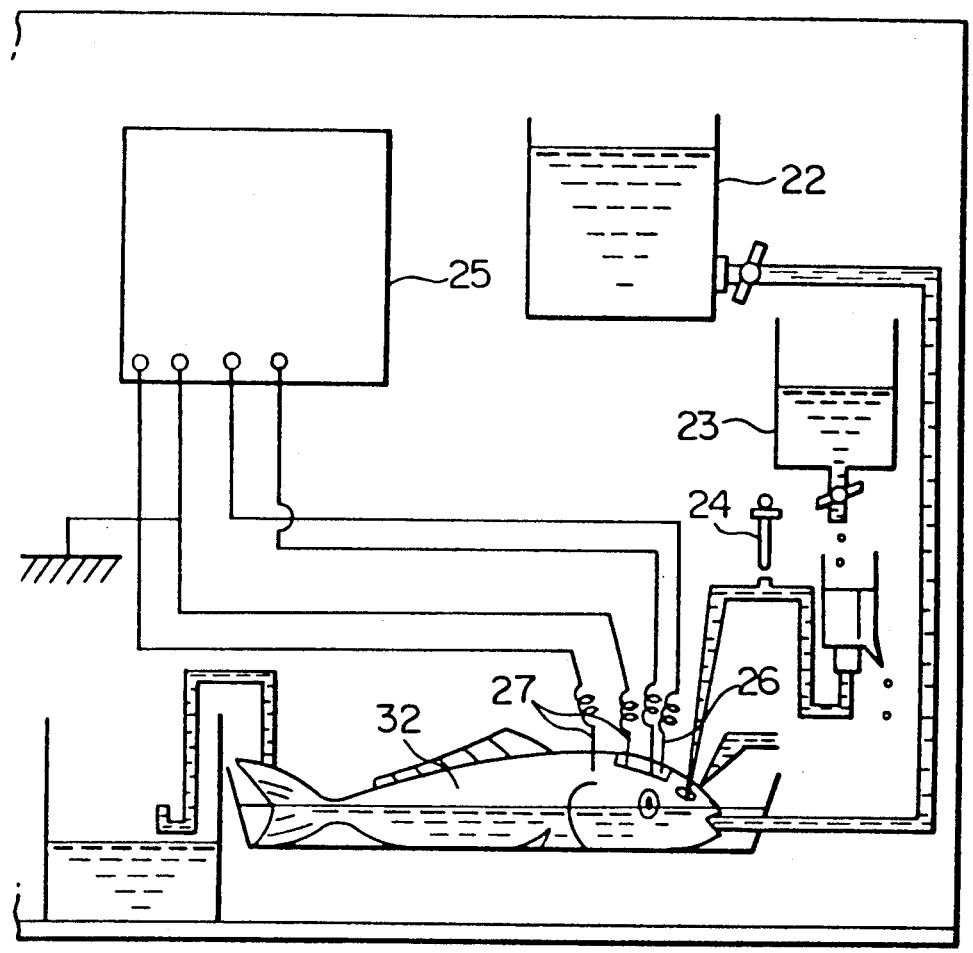
FIG. 3 is an enlarged view of the main part of the equipment of FIG. 2.
Figure 4:
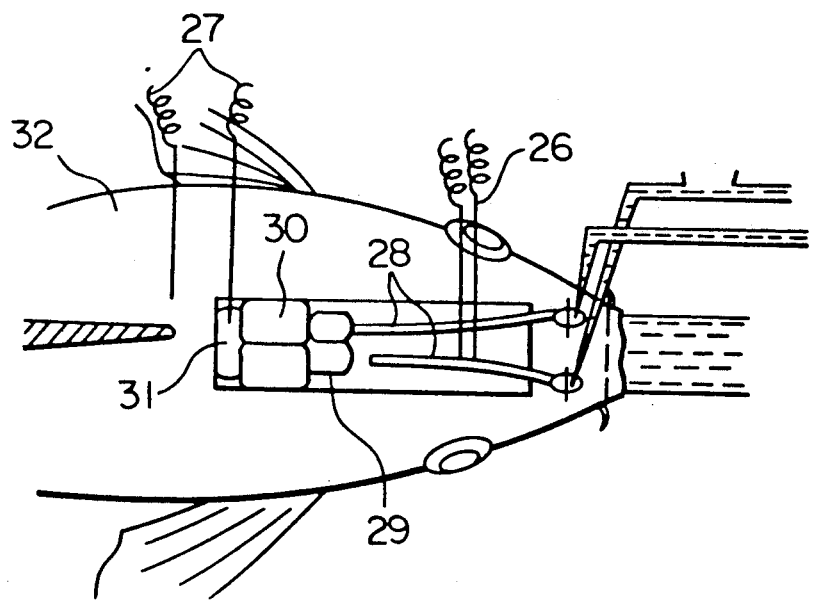
FIG. 4 is a main part enlarged view of FIG. 2 to illustrate details of the manner of the above described experiments.

FIG. 2, FIG. 3 and FIG. 4 illustrate an equipment for measurement of electrical responses from an olfactory tract and a method therefor.

In the figures, the numeral 21 denotes a sealed box; 22, rearing water for respiration; 23, rearing water for adding test solution; 24, a test solution; 25, an input box; 27, ground; 28, an olfactory tract; 29, a rhinencephalon; 30, a lobus opticus; 31, a cerebellum; 32 an experimental fish; and 33, an electro-encephalograph.

As illustrated in the figures, the experimental fish 32 is set in the sealed box 21. The experimental fish 32 has been anesthetized with gallamine triethiodide (a muscle relaxant). Hence the fish cannot breathe (i.e., gills do not move), and the rearing water 22 is introduced in the oral cavity to supply oxygen. On the other hand, the rearing water 23 is continually introduced into the nostril. Under this condition, the test solution 21 is dropwise added to the flow of the rearing water 23, so that the test solution 24 is mixed into the flow of the rearing water 23 and reaches olfactory epithelial cells inside the nostril to give a stimulus. This stimulus makes an electrical stimulus, which runs through the olfactory tract 28, and is presumed to be transmitted to the rhinencephalon 29, the lobus opticus 30 and the cerebellum 31 to cause a feeding action. In the present experiment, this electrical stimulus is taken out from electrodes, brought into contact with the olfactory tract 28 and transmitted to the input box 25, which goes out of the sealed box 21 from the input box 25, and is led to the electro-encephalograph 33, and thus a stimulus wave is recorded in the electro-encephalograph 33.

Figure 5A:
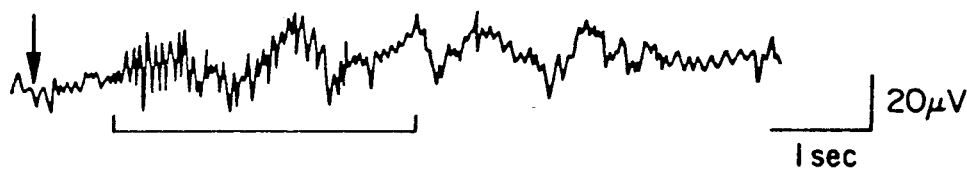
FIG. 5A is a view showing an electrical response observed when $1\text{-}^{-3}$ M of dimethyl-$\beta$-propiothetin was added in the above described experiments.
Figure 5B:
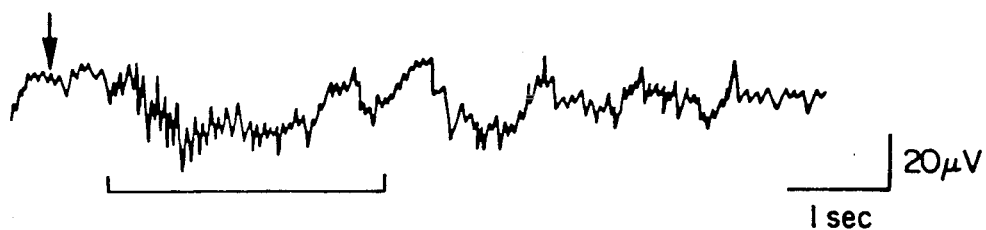
FIG. 5B is a view showing an electrical response observed when $10^{-3}$ M of glutamine was added in the above described experiments.

An electrical response obtained by dropwise adding $10^{-3}$ M of dimethyl-$\beta$-propiothetin following the method as described above is shown in FIG. 5A, and an electrical response similarly obtained by dropwise adding $10^{-3}$ M of glutamine is shown in FIG. 5B. In the figures, the arrow indicates a point of the time when the test solution was dropwise added. Thus, the figures show that dimethyl-$\beta$-propiothetin and glutamine have almost similar stimulation actions when added in a concentration of $10^{-3}$ M.

Figure 6A:
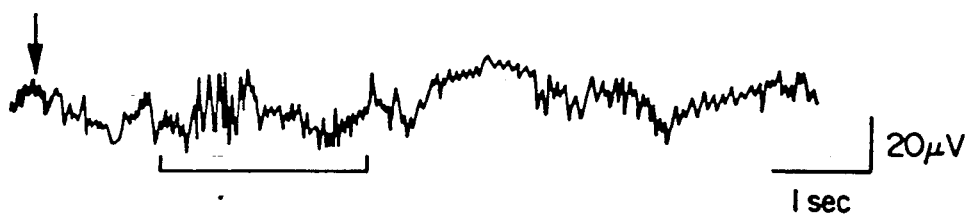
FIG. 6A is a view showing an electrical response observed when $10^{-6}$ M of dimethyl-$\beta$-propiothetin was added in the above described experiments.
Figure 6B:
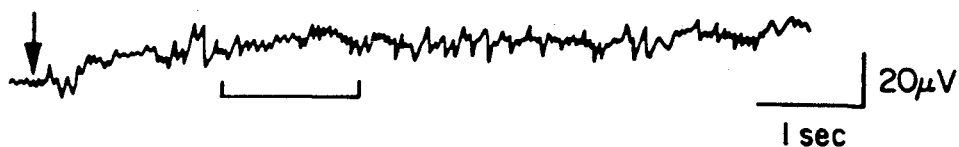
FIG. 6B is a view showing an electrical response observed when $10^{-6}$ M of glutamine was added in the above described experiments.

Next, an electrical response obtained by dropwise adding $10^{-6}$ M of dimethyl-$\beta$-propiothetin following the method as described above is shown in FIG. 6A, and an electrical response similarly obtained by dropwise adding $10^{-6}$ M of glutamine is shown in FIG. 6B. Thus, the figures show that dimethyl-$\beta$-propiothetin has an almost unchanged stimulation action, while the glutamine shows a greatly decreased stimulation action, when added in a concentration of $10^{-6}$ M. Accordingly, the dimethyl-$\beta$-propiothetin has the action to simulate the olfactory tract of fishes even with a very small amount, and can be said to be epock-making as a feeding stimulator.

EXAMPLE 7

Commercially available solid pellet feeds for goldfishes, red sea breams and young yellowtails were each formed into powder, and added to 1 g of the resulting powder was 0.5 ml each of an aqueous solution containing dimethyl-$\beta$-propiothetin in a concentration of 1 mM in the case of fresh-water fishes or 5 mM in the case of sea water fishes, which were kneaded together in a mortar, thus preparing feeds.

Using the feeds thus prepared and a feed to which an equal amount of water was added in place of the aqueous dimethyl-β-propiothetin solution, respectively, goldfishes, red sea breams and young yellowtails were reared to measure the rate of body weight gains.

For the goldfishes, 10 heads were reared using a styrol water tank having a capacity of 3.5 l; and for the red sea breams and the young yellow tails, 5 heads each were reared using a styrol water tank having a capacity of 7.5 lit. The water temperature at the rearing was maintained at 20° to 22° C. in all instances.

The goldfishes were fed twice a day in the morning and in the evening, and the red sea breams and the young yellowtails were fed three times a day in the morning, in the afternoon and in the evening. The fishes were fed in such a manner that they may be fed up for 20 minutes at every time, and the water was changed for new one after lapse of 20 minutes.

Figure 7:
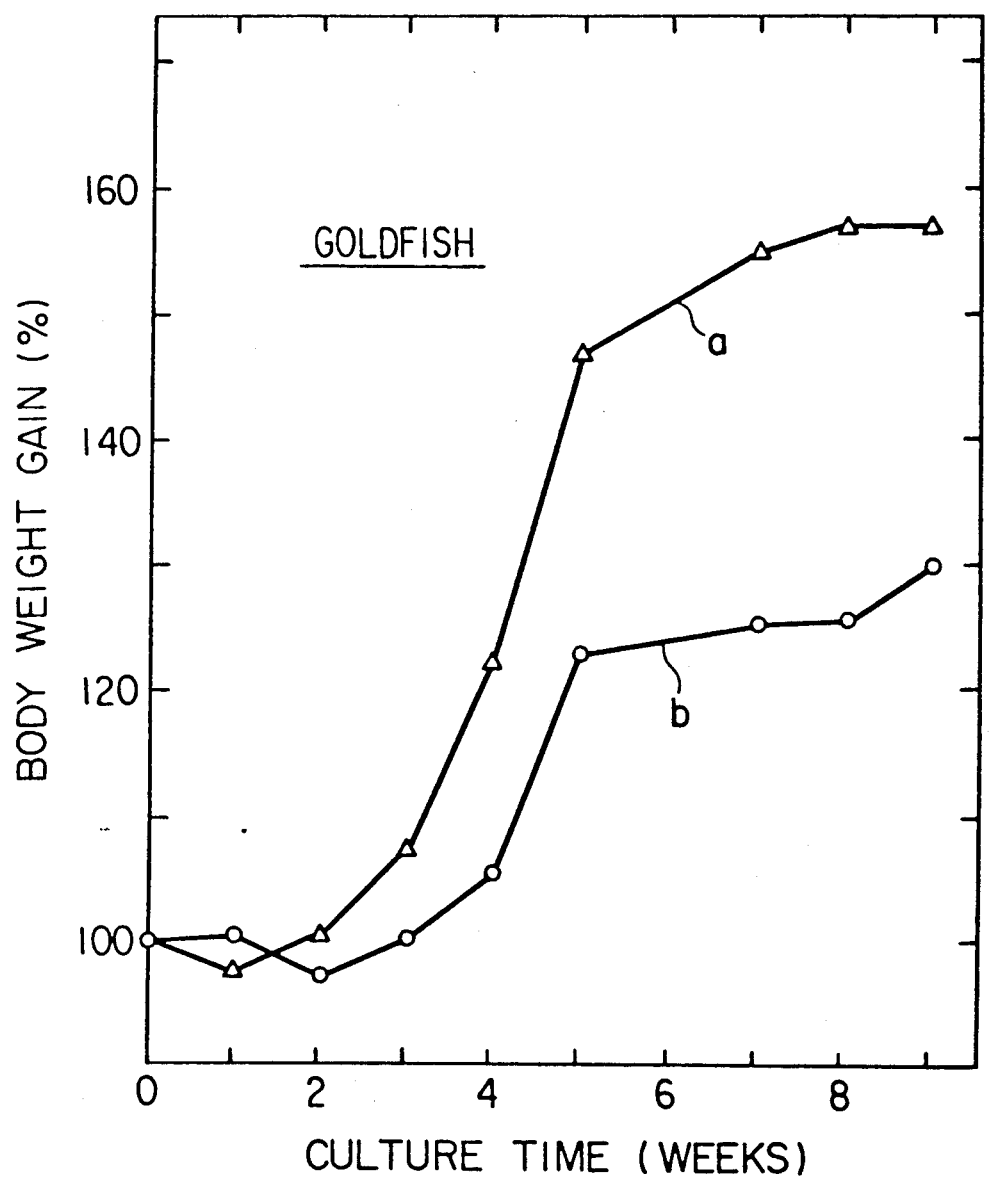
FIG. 7 is a graph showing the growth progress of goldfishes when a feed to which dimethyl-$\beta$-propiothetin was added was fed.

The rates of body weight gains of goldfishes, thus measured, are shown in FIG. 7. In the figure, line a represents the results obtained when the fishes were reared using the feed to which the aqueous dimethyl-β-propiothetin solution was added, and line b represents the results obtained when they were reared using the feed to which water was added in place of the aqueous dimethyl-β-propiothetin solution. The data of the measurements are indicated in average values of 10 heads.

Figure 8:
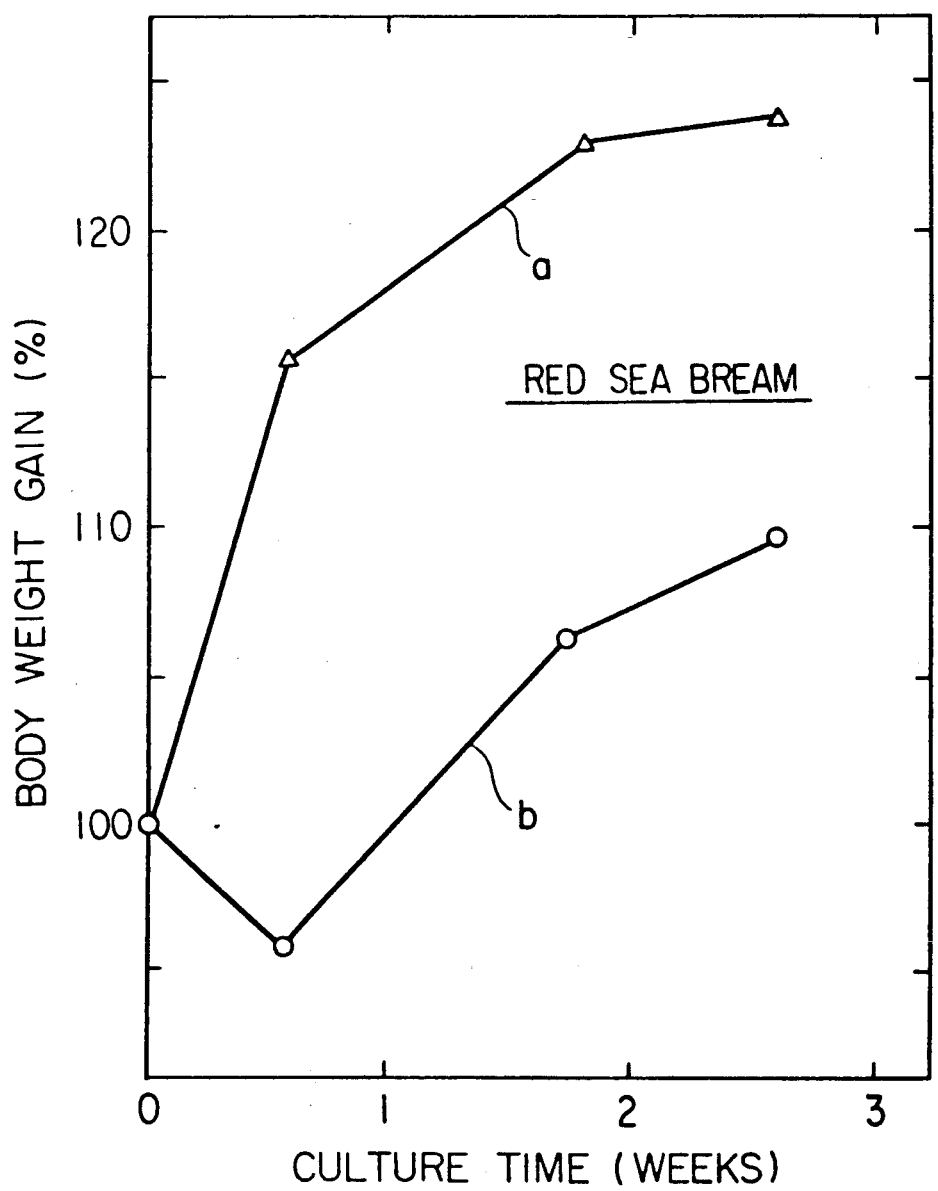
FIG. 8 is a graph showing the growth progress of red sea breams when a feed to which dimethyl-$\beta$-propiothetin was added was fed.

The rates of body weight gains of the red sea breams, measured in the above manner, are also shown in FIG. 8. In the figure, line a represents the results obtained when the fishes were reared using the feed to which the aqueous dimethyl-β-propiothetin solution was added, and line b represents the results obtained when they were reared using the feed to which water was added in place of the aqueous dimethyl-β-propiothetin solution. The data of the measurements are indicated in average values of 5 heads.

Figure 9:
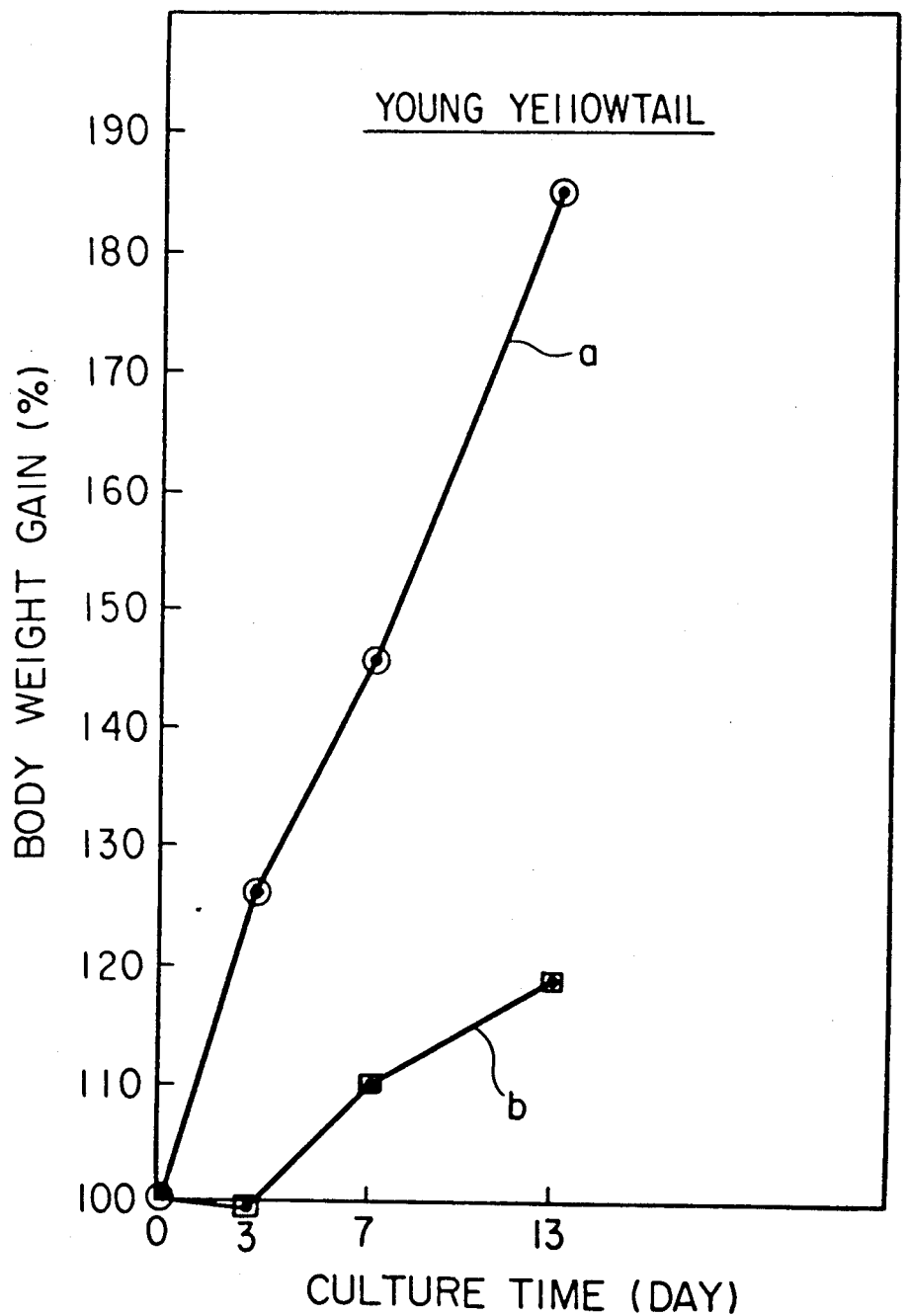
FIG. 9 is a graph showing the growth progress of young yellowtails when a feed to which dimethyl-$\beta$-propiothetin was added was fed.

The rates of body weight gains of the young yellowtails, measured in the above manner, are further shown in FIG. 9. In the figure, line a represents the results obtained when the fishes were reared using the feed to which the aqueous dimethyl-β-propiothetin solution was added, and line b represents the results obtained when they were reared using the feed to which water was added in place of the aqueous dimethyl-β-propiothetin solution. The data of the measurements are indicated in average values of 5 heads.

These results tell that employment of the feeds to which dimethyl-β-propiothetin is added can bring about a much superior growth promotion effect.

EXAMPLE 8

Using the laboratory equipment as illustrated in FIG. 1, the feeding-stimulation effect to goldfishes were measured in respect of various compounds according to the same method as in Example 1. Cellulose powder was used as a base feed. Aqueous solutions in which the compounds to be tested were respectively dissolved in a concentration of $10^{-3}$ M were prepared. The above base feed was taken up in an amount of 0.5 g, and 0.8 ml each of the above aqueous solutions was added thereto, which were kneaded together in a mortar, thus preparing feeds. The measurement was repeated 5 times for each, and the sum of the times the fishes struck the feeds in 5 times was calculated to make evaluation based on relative values (relative striking strength) assuming as 100 the times the fishes struck the dimethyl-β-propiothetin-added feed. Results obtained are shown in Table 8.

TABLE 8

(Compounds showing strong feeding-stimulation effect)

| Compound | Relative striking strength |
|---|---|
| Dimethyl-β-propiothetin | 100 |
| (Compounds analogous to dimethyl-β-propiothetin) | |
| 3-(Methylthio)-1-propanal | 35 |
| 3-(Methylthio)-1-propylamine | 32 |
| 3-(Methylthio)-1-propanol | 41 |
| 2-Mercaptoacetic acid | 63* |
| Methyl-3-(methylthio)-1-propanoic acid | 59 |
| 3-(Methylthio)-1-propanoic acid | 59 |
| 3-Mercaptopropanoic acid | 59 |
| Dimethylthetin | 93** |
| (Compounds analogous to constituent component of dimethyl-β-propiothetin) | |
| Dimethyl sulfide | 43 |
| Diethyl sulfide | 45 |
| Dipropyl sulfide | 73** |
| Dibutyl sulfide | 62* |
| Diallyl sulfide | 14 |
| Diallyl sulfide | 14 |
| Dimethyl disulfide | 56 |
| Diethyl disulfide | 47 |
| Dipropyl disulfide | 47 |
| Dimethyl sulfite | 52 |
| Dimethyl sulfoxide | 77** |
| Dimethyl sulfone | 67* |
| (Sulfur-containing heterocyclic compounds) | |
| Saccharin | 61* |
| Thiamine | 28 |
| 2,4,6-trimethyldihydro-1,3,5-dithiazine | 43 |
| (Amino acid having a high feeding-stimulation effect) | |
| Glutamine | 64 |

In Table 8, the mark "*" denotes a compound that can show substantially the same feeding-stimulation effect as glutamine, and the mark "**" denotes a compound that can show a feeding-stimulation effect exceeding that of glutamine. Thus, all of dimethylthetin, 2-mercaptoacetic acid, dipropyl sulfide, dibutyl sulfide, dimethyl sulfoxide and dimethyl sulfone are seen to have substantially the same feeding-stimulation effect as glutamine or the effect more than that. In these compounds, no feeding-stimulation effect was obtained superior to that of dimethyl-β-propiothetin, but these compounds also have the possibility that they can be sufficiently put into practical use as feeding stimulators since, in practical use; not only the feeding-stimulation effect, but also other factors such as cost and safety are taken into account.

EXAMPLE 9

Using the laboratory equipment as illustrated in FIG. 1, the feeding-stimulation effect to goldfishes was measured in respect of various compounds according to the same method as in Example 1. Cellulose powder was used as a base feed. Aqueous solutions in which the compounds to be tested were respectively dissolved in a concentration of $10^{-3}$ M were prepared. The above base feed was taken up in an amount of 0.5 g, and 0.8 ml each of the above aqueous solutions was added thereto, which were kneaded together in a mortar, thus preparing feeds. The measurement was repeated 5 times for each, and the sum of the times the fishes struck the feeds in 5 times was calculated to make evaluation. Results obtained are shown below.

| (Test solution) | (Evaluation) |
|---|---|
| Control (water only) | 174 |
| Carboxymethyldiethylsulfonium bromide | 419 |
| Carboxymethyldipropylsulfonium bromide | 360 |
| Carboxymethyldibutylsulfonium bromide | 310 |
| Carboxymethyldipentylsulfonium bromide | 294 |
| Carboxypropyldimethylsulfonium bromide | 373 |
| Carboxybutyldimethylsulfonium bromide | 359 |
| Carboxypentyldimethylsulfonium bromide | 310 |
| Carboxymethylmethyldimethylsulfonium bromide | 377 |
| Carboxyethyldiethylsulfonium bromide | 432 |
| Carboxyethyldipropylsulfonium bromide | 413 |
| Carboxy-1-methylethyldimethylsulfonium bromide | 346 |
| Carboxy-2-methylethyldimethylsulfonium bromide | 354 |
| Carboxy-1-methylpropyldimethylsulfonium bromide | 327 |
| Carboxy-2-methylpropyldimethylsulfonium bromide | 321 |
| Carboxy-3-methylpropyldimethylsulfonium bromide | 322 |
| Carboxy-2-ethylpropyldimethylsulfonium bromide | 331 |
| Dimethyl sulfide | 271 |
| Dipropyl trisulfide | 270 |
| Methylethyl sulfide | 268 |
| Methylpropyl sulfide | 275 |
| Methylbutyl sulfide | 271 |
| Methylallyl sulfide | 255 |
| Ethylpropyl sulfide | 264 |
| Ethylbutyl sulfide | 262 |

EXAMPLE 10

(1) Experiment method and equipment

Figure 10:
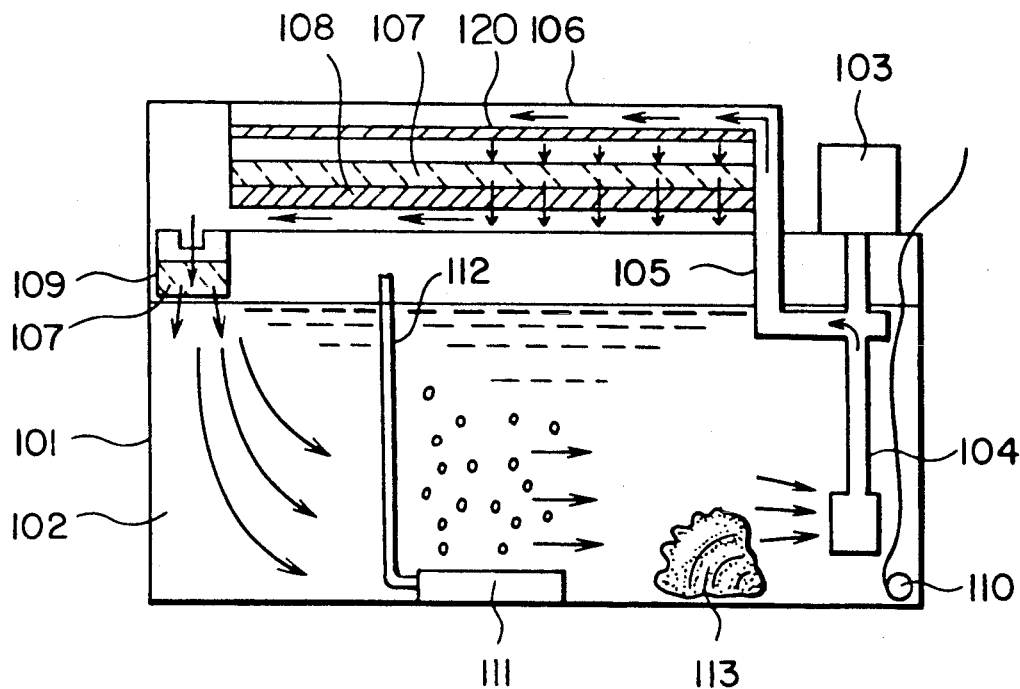
FIG. 10 is a schematic view of equipment used in experiments for testing feeding-stimulation effect to shellfishes on various stimulators.

FIG. 10 illustrates equipment used in experiments for feeding-stimulation effect on shellfishes. To describe this equipment, sea water 102 is stocked in a water tank 101. A pump 3 is provided at the upper part of the water tank, and a suction pipe 104 connected to the pump 103 is extended in the water tank 101. The suction pipe 104 sucks the sea water 102 in the water tank 101 from the bottom part by the operation of the pump 103, and sends the sea water 102 through an introducing pipe 105 into a first filter chamber 106 disposed on the top of the water tank 101. A shelf 120 comprising a perforated plate is disposed in the first filter chamber 106, and the sea water 102 flows through the upper space of this shelf 120 in the direction from right to left when viewed in the drawing, in the course of which the sea water is passed through the holes of the shelf 120 and drops downward little by little. Glass-wool 107 and an activated-carbon layer 108 are provided below the shelf 120. The sea water 102 dropped from the shelf 120 is passed through these filter members and made clean, and then flows through the bottom part of the first filter chamber 106 to the left direction when viewed in the drawing. A second filter chamber 109 is provided at a sea water outlet formed at the left side of the first filter chamber 106 when viewed in the drawing, and filter glass wool 107 is also packed in it. Hence, the sea water 102 circulates in the order of the water tank 101→the suction pipe 104→the introducing pipe 105→the firsts filter chamber 106 →the second filter chamber 109→the water tank 101, and is always kept clean. A heater 10 is also provided inside the water tank 101, so that the temperature of the sea water 102 can be kept at a moderate temperature (25° C.). An air stone 111 is further provided inside the water tank 101, so that air can be introduced from an air pipe 112 by the action of an air pump (not shown) and air bubbles can be sent into the sea water 102. The numeral 113 denotes a top shell (a parent shell) used in the experiments.

Figure 11:
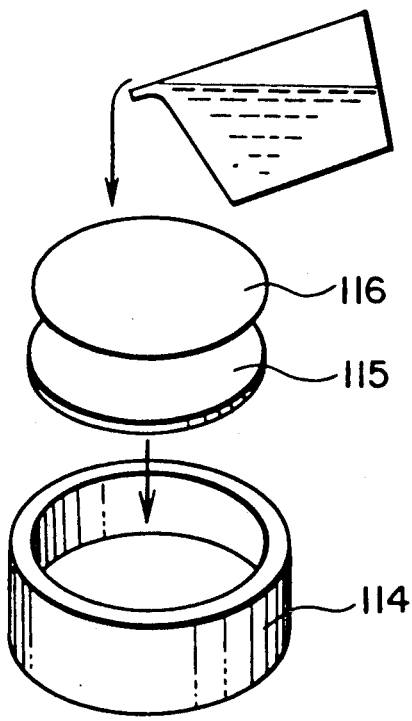
FIG. 11 is a perspective view showing how to prepare a specimen used in the above described experiments.
Figure 12:
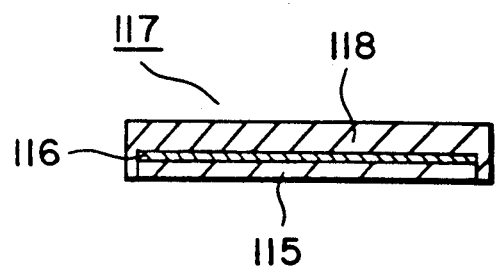
FIG. 12 is a cross sectional view of the specimen in FIG. 11.
Figure 13:
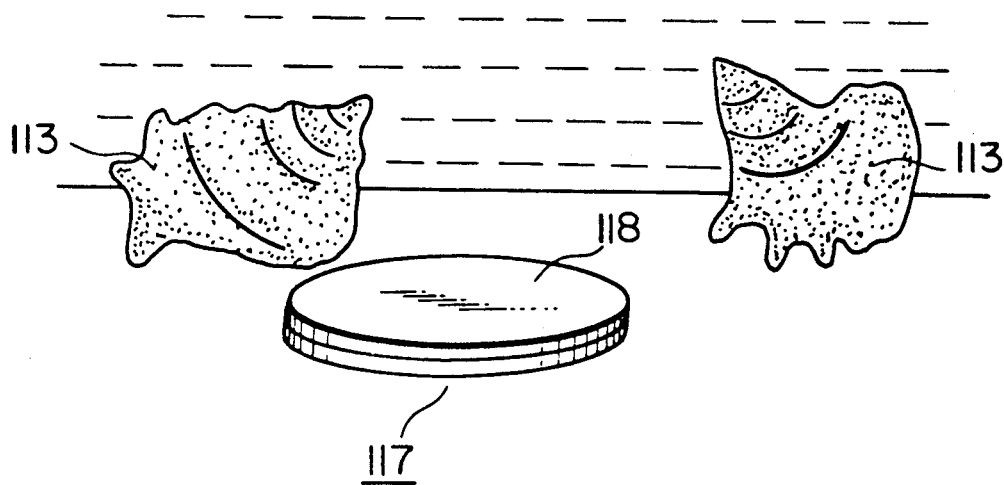
FIG. 13 is a perspective view showing the state evaluated as 1 in the above described experiments.
Figure 14:
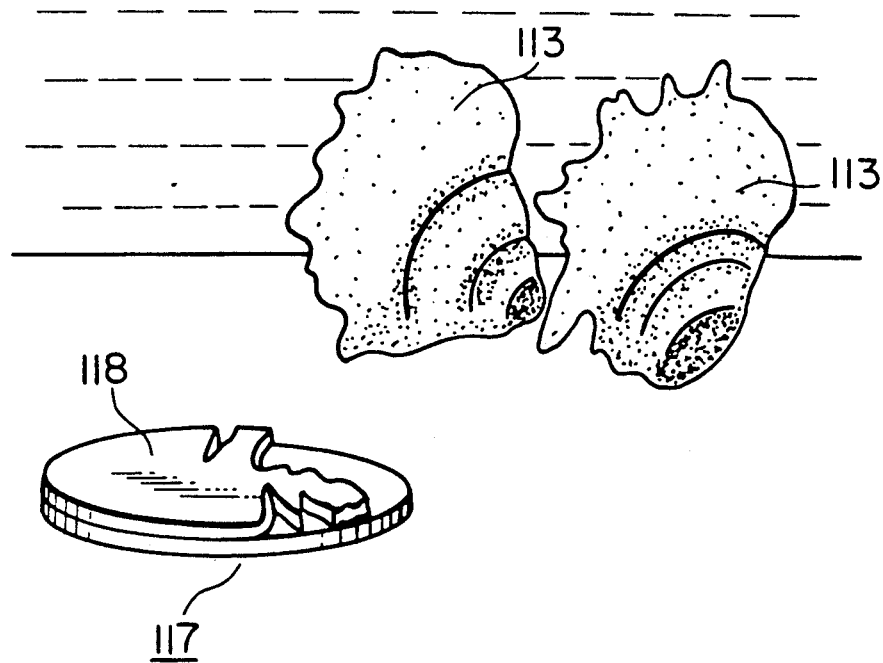
FIG. 14 is a perspective view showing the state evaluated as 2 in the above described experiments.
Figure 15:
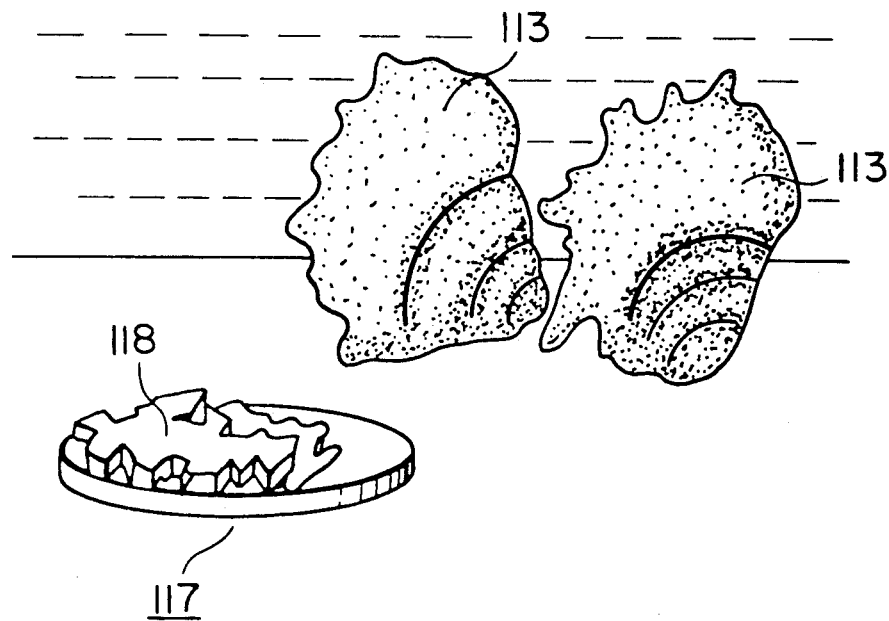
FIG. 15 is a perspective view showing the state evaluated as 3 in the above described experiments.
Figure 16:
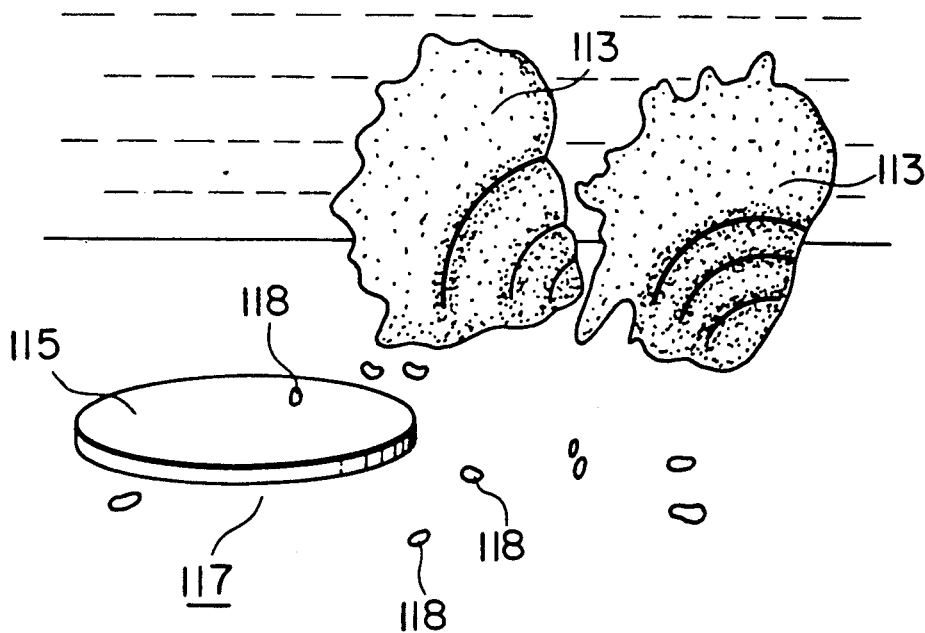
FIG. 16 is a perspective view showing the state evaluated as 4 in the above described experiments.

FIG. 11 illustrates how to make specimens used in the experiments. A lead disc 115 of 9 cm in diameter and 1.5 mm in thickness and a filter paper 116 of 9 cm in diameter are laid overlapping in succession on the bottom of a cylindrical container made Of steel and having an inner diameter of 10 cm. On the filter paper 116, 2 ml of distilled water or test solution for use in the experiments is dropped in a concentric form and uniformly coated. From the upper side thereof, 60 ml of an aqueous 2% agar solution left cooled to 50° C. was gently poured, immediately followed by solidification using ice. Thereafter, the lead disc 115 is taken away to prepare a specimen 117 as illustrated in FIG. 12. This specimen 117 comprises the filter paper 116 impregnated with the distilled water or test solution and the agar 118 solidified, which are laminated on the lead disc 115. The test solution used was obtained by dissolving the substance to be tested in distilled water in a concentration of 10 mM ($10^{-2}$ M).

The top shell (parent shell) 113 was reared in the water tank 101 with six top shells stocked for each experiment. Then the specimen 117 prepared in the above manner was sent to the bottom of the water tank 101 and left overnight to observe how it stands. During the experiments, the introduction of the air into the water tank 101 by the air stone 111 was stopped to prevent the test substance from being immediately dissolved in the sea water 102.

The results of the experiments were evaluated according to the following criterions:

1 ... No change is seen at all.

2 ... The agar 118 has considerably lost its original shape.

3 ... The agar 118 has considerably lost its original shape and the filter paper 116 has also been torn off.

4 ... The agar 118 has completely lost its original shape and the filter paper 116 has also been ate up.

FIG. 13, FIG. 14, FIG. 15 and FIG. 16 illustrate the states corresponding to Evaluation 1, Evaluation 2, Evaluation 3 and Evaluation 4, respectively.

(2) Test substances

The feeding stimulators of the present invention, described above, were used as test substances. For comparison, feeds to which distilled water was added was also tested in the same manner.

(3) Experimental results

| (Test solution) | (Evaluation) |
|---|---|
| Distilled water | 1 |
| Dimethyl sulfide | 2 |
| Diethyl sulfide | 2 |
| Dipropyl sulfide | 3 |
| Dibutyl sulfide | 2 |
| Dimethyl disulfide | 2 |
| Diethyl disulfide | 2 |
| Dipropyl disulfide | 3 |
| Dibutyl disulfide | 2 |
| Diallyl sulfide | 2 |
| Diallyl disulfide | 2 |
| Propylallyl sulfide | 2 |
| Propyoctyl sulfide | 2 |
| Dimethyl sulfite | 2 |
| Dimethyl sulfate | 2 |
| Dimethyl sulfone | 3 |
| Dimethyl sulfoxide | 3 |
| Diethyl sulfone | 3 |
| Diethyl sulfoxide | 3 |
| Dipropyl sulfoxide | 3 |
| Methyl-(3-methylthio)-propanoate | 2 |
| 2-Mercaptoacetic acid | 2 |
| 3-Methylthiopropanoic acid | 2 |

-continued

| (Test solution) | (Evaluation) |
|---|---|
| 3-Mercaptopopanoic acid | 2 |
| 3-Methylthiopropanol | 2 |
| 3-Methylthiopropylamine | 2 |
| 3-Methylthiopropanal | 2 |
| Carboxymethyldimethylsulfonium (dimethylthetin) | 4 |
| Carboxyethyldimethylsulfonium (dimethyl-$\beta$-propiothetin) | 4 |
| Carboxypropyldimethylsulfonium | 3 |
| Carboxydimethyldimethylsulfonium | 3 |
| Carboxybutyldimethylsulfonium | 3 |

Like experiments were also made in respect of the salts of these compounds to obtain the like results.

These results demonstrate that all the feeding stimulators of the present invention have the feeding-stimulation effect to shellfishes. The results also demonstrated that, among these stimulators, dipropyl sulfide, dipropyl disulfide, dimethyl sulfone, dimethyl sulfoxide, diethyl sulfone, diethyl sulfoxide, dipropyl sulfoxide, carboxymethyldimethylsulfonium (dimethylthetin), carboxyethyldimethylsulfonium (dimethyl-$\beta$-propiothetin), carboxypropyldimethylsulfonium, carboxydimethyldimethylsulfonium and carboxybuyldimethylsulfonium have a superior feeding stimulation effect, and also among these, carboxymethyldimethylsulfonium (dimethylthetin) and carboxyethyldimethylsulfonium (dimethyl-$\beta$-propiothetin) have the best effect.

The feeding-stimulation effect of these substances was seen not only on top shells, but also on other shellfishes such as abalones and oysters.

EXAMPLE 1

The above Example 10 was repeated to measure the feeding stimulation effect of various compounds on shellfishes. The shellfishes used were top shells like the above. Results obtained are shown below.

| (Test solution) | (Evaluation) |
|---|---|
| Distilled water | 1 |
| Carboxymethyldiethylsulfonium bromide | 3 |
| Carboxymethyldipropylsulfonium bromide | 2 |
| Carboxymethyldibutylsulfonium bromide | 2 |
| Carboxymethyldipentylsulfonium bromide | 2 |
| Carboxypentyldimethylsulfonium bromide | 2 |
| Carboxyethyldiethylsulfonium bromide | 2 |
| Carboxyethyldipropylsulfonium bromide | 3 |
| Carboxy-1-methylethyldimethylsulfonium bromide | 3 |
| Carboxy-2-methylethyldimethylsulfonium bromide | 2 |
| Carboxy-1-methylpropyldimethylsulfonium bromide | 2 |
| Carboxy-2-methylpropyldimethylsulfonium bromide | 2 |
| Carboxy-3-methylpropyldimethylsulfonium bromide | 2 |
| Carboxy-2-ethylpropyldimethylsulfonium bromide | 2 |
| Methylethyl sulfide | 2 |
| Methylpropyl sulfide | 2 |
| Methylbutyl sulfide | 2 |
| Ethylpropyl sulfide | 2 |
| Ethylbutyl sulfide | 2 |
| Glutamine | 2–3 |
| Histidine | 2 |
| Glycinebetaine | 2 |
| Trimethylamine | 2 |
| Trimethylamine oxide | 2 |

These results show that all the feeding stimulator of the present invention have the feeding-stimulation effect on shellfishes.

The feeding-stimulation effect of these substance was seen not only on top shells, but also on other shellfishes such as abalones and oysters.

EXAMPLE 12

Using the laboratory equipment as illustrated in FIG. 1, the feeding-stimulation effect on goldfishes was measured in respect of various compounds according to the same method as in the above Example. Cellulose powder was used as a base feed. Aqueous solutions in which the compounds to be tested were respectively dissolved in a concentration of $10^{-3}$ M were prepared. The above base feed was taken up in an amount of 0.5 g, and 0.7 ml each of the above aqueous solutions was added thereto, which were kneaded together in a mortar, thus preparing feeds. The measurement was repeated 5 times for each, and the sum of the times the fishes struck the feeds in 5 times was calculated to make evaluation. Results obtained are shown in Table 9.

Table 9 shows that choline has a smaller feeding-stimulation effect than dimethyl-$\beta$-propiothetin, but substantially the same effect as dimethylthetin.

TABLE 9

Comparison of the effect of several efficient compounds on the striking response of goldfishes

| Compound* | Experiment times | | | | | | Sum |
|---|---|---|---|---|---|---|---|
| | 1 | 2 | 3 | 4 | 5 | 6 | |
| | Striking times | | | | | | |
| Choline chloride | 30 | 14 | 57 | 20 | 48 | 34 | 203 |
| Betaine hydrochloride | 28 | 14 | 28 | 40 | 35 | 18 | 163 |
| Methyl methionine | 51 | 23 | 21 | 21 | 45 | 18 | 179 |
| Dimethylthetin | 60 | 5 | 42 | 26 | 38 | 29 | 200 |
| Dimethyl-$\beta$-propiothetin | 35 | 31 | 52 | 45 | 50 | 42 | 255 |
| Control | 15 | 26 | 23 | 4 | 28 | 9 | 105 |

*Each compound was used in a concentration of $10^{-3}$M. The feeds were prepared by mixing cellulose powder (0.5 g) in each test solution (0.7 ml).

What is claimed is:

1. A feed composition for fishes and shellfishes, consisting essentially of
   (i) a feed component selected from the group consisting of a synthetic feed, a semi-natural feed and a wholly natural feed for fish or shellfish and
   (ii) an effective amount of at least one feeding stimulator selected from the compounds, or salts thereof, represented respectively by the following formulas (I) to (III):

(I)

wherein $R_1$ and $R_2$ are the same or different and each represents a hydrogen atom, an alkyl group having 1 to 5 carbon atoms, a mercapto group, an amino group or an alkyloxy group; $X^-$ represents a monovalent anion; and an is an integer of 1 to 5;

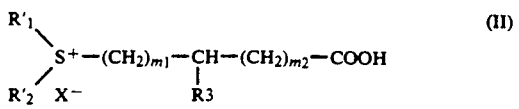

(II)

wherein $R_1$ and $R_2$ are each an alkyl group having 1 to 5 carbon atoms, $X^-$ is the same as defined above; $R_3$ represents a group selected from the group consisting of an alkyl group having 1 to 2 carbon atoms, an amino group, a methoxy group and a mercapto group and $m_1$ and $m_2$ are each 0 to 2;

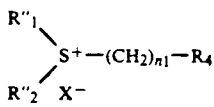 (III)

wherein $R''_1$ and $R''_2$ are each an alkyl group having 1 to 5 carbon atoms, $X^-$ is the same as defined above, $n_1$ is zero or 1 and $R_4$ is a group selected from the group consisting of an alkyl group having 1 to 4 carbon atoms, an amino group, an alkyloxy group, an alkoxycarbonyl group, a mercapto group and a carbamoyl group.

2. A feed composition for fishes and shellfishes, consisting essentially of
(i) a feed component selected form the group consisting of a synthetic feed, a semi-natural feed and a wholly natural feed for fish or shellfish and
(ii) an effective amount of at least one feeding stimulator selected from the compounds, or salts thereof, represented respectively by the following formulas (I) and (II):

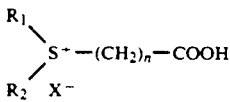 (I)

wherein $R_1$ and $r_2$ are each an alkyl group having 1 to 5 carbon atoms, n is 1 to 5 and $X^-$ is a monovalent anion;

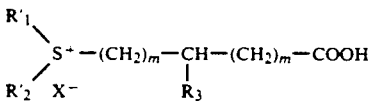 (II)

wherein $R'_1$ and $R'_2$ are each alkyl group having 1 to 5 carbon atoms, $X^-$ is a monovalent anion, $R_3$ is a an alkyl group having 1 to 2 carbon atoms and $m_1$ and $m_2$ are each 0 to 2.

3. A feeding composition for fishes and shellfishes consisting essentially of
(i) a feed component selected from the group consisting of a synthetic feed, a semi-natural feed and a wholly natural feed for fish or shellfish and
(ii) an effective amount of at least one feed stimulator selected from the group consisting of dimethyl-β-propiothetin, dimethylthetin, carboxymethyldiethylsulfonium, carboxymethyldipropylsulfonium, carboxymethyldibutylsulfonium, carboxymethyldipentylsulfonium, carboxypropyldimethylsulfonium, carboxybutyldimethylsulfonium, carboxypentyldimethylsulfonium, carboxymethylmethyldimethylsulfonium, carboxyethyldiethylsulfonium, carboxyethyldipropylsulfonium, carboxy-1-methylethyl-dimethylsulfonium, carboxy-2-methylethyldimethylsulfonium, carboxy-1-methylpropyldimethylsulfonium, carboxy-2-methylpropyldimethylsulfonium, carboxy-3-methylpropyldimethylsulfonium, carboxy-2-ethylpropyldimethylsulfonium, and salts thereof.

4. The feed composition according to claim 1, wherein $R'_1$, $R'_2$, $R''_1$ and $R''_2$ are an alkyl group having one carbon atoms or a methoxy group and $R_4$ is an alkyl group having one or four carbon atoms.

5. The feed composition according to claim 1, wherein the feed stimulator is a compound selected from the group consisting of carboxymethysulfonium, carboxymethyldiaminosulfonium, carboxymethyldimethoxysulfonium, carboxymethylmethylmercaptosulfonium, 3-carboxy-2-aminopropyldimethylsulfonium, 3-carboxy-2-methoxypropyldimethylsulfonium, 3-carboxy-2-mercaptopropyldimethylsulfonium, 2-trimethylethyldimethylsulfonium, aminomethyldimethylsulfonium, aminocarboxymethyldimethylsulfonium, ethylcarboxymethyldimethylsulfonium, emrcaptomethyldimethylsulfonium, aminodimethylsulfonium, methoxydimethylsulfonium, trimethyulsulfonium, mercaptodimethylsulfonium, and salts thereof.

6. The feed composition of claim 1 wherein the feeding stimulator is a compound of Formula (I) or salt thereof.

7. The feed composition of claim 6 wherein the compound of Formula (I) is carboxymethyldimethylsulfonium or carboxyethyldimethylsulfonium.

8. The feed composition according to claim 1, which was obtained by adding an aqueous solution containing $10^{-10}$ to $10^{-1}$ M of said feeding stimulator to said at least one feed component (i).

9. The feed composition according to claim 2, which was obtained by adding an aqueous solution containing $10^{-10}$ to $10^{-1}$ M of said feeding stimulator to said at least one feed component (i).

10. The feed composition according to claim 1, wherein said at least one feeding stimulator (ii) is in an amount of from $9.0 \times 10^{-7}$ to $3.0 \times 10^5$ ppm based on the total of said feed composition.

11. The feed composition according to claim 1, wherein said at least one feeding stimulator (ii) is in an amount of from $1.08 \times 10^{-5}$ to $1.08 \times 10^{-4}$ ppm based on the total of said feed composition.

12. The feed composition according to claim 2, wherein said at least one feeding stimulator (ii) is in an amount of from $1.08 \times 10^{-5}$ to $1.08 \times 10^{-4}$ ppm based on the total of said feed composition.

13. The feed composition of claim 11 wherein said at least one feed component (i) is a cellulosic powder.

14. The feed composition of claim 12 wherein said at least one feed component (i) is a cellulosic powder.

15. The feed composition of claim 13 wherein said at least one feed component (i) is a cellulosic powder.

16. A method of feeding at least one of fishes and shellfishes by providing the feed composition according to claim 1 to a site containing said at least one of fishes and shellfishes.

17. A method of feeding at least one of fishes and shellfishes by providing the feed composition according to claim 2 to a site containing said at least one of fishes and shellfishes.

18. A method of feeding at least one of fishes and shellfishes by providing the feed composition according to claim 3 to a site containing said at least one of fishes and shellfishes.

19. A method of feeding at least one of fishes and shellfishes by providing the feed composition according to claim 8 to a site containing said at least one of fishes and shellfishes.

20. A method of feeding at least one of fishes and shellfishes by providing the feed composition according to claim 9 to a site containing said at least one of fishes and shellfishes.

21. A method of feeding at least one of fishes and shellfishes by providing the feed composition according to claim 10 to a site containing said at least one of fishes and shellfishes.

22. A method of feeding at least one of fishes and shellfishes by providing the feed composition according to claim 11 to a site containing said at least one of fishes and shellfishes.

23. A method of feeding at least one of fishes and shellfishes by providing the feed composition according to claim 12 to a site containing said at least one of fishes and shellfishes.

24. A method of feeding at least one of fishes and shellfishes by providing the feed composition according to claim 13 to a site containing said at least one of fishes and shellfishes.

25. A method of feeding at least one of fishes and shellfishes by providing the feed composition according to claim 14 to a site containing said at least one of fishes and shellfishes.

26. A method of feeding at least one of fishes and shellfishes by providing the feed composition according to claim 15 to a site containing said at least one of fishes and shellfishes.

27. The feed composition of claim 1, wherein the feeding stimulator is carboxymethyldimethylsulfonium and the feed component is a cellulosic powder.

28. A method of feeding at least one of fishes and shellfishes by providing the feed composition according to claim 27 to a site containing said at least one of fishes and shellfishes.

29. The feed composition of claim 1, wherein the feeding stimulator is carboxyethyldimethylsulfonium and the feed component is a cellulosic powder.

30. A method of feeding at least one of fishes and shellfishes by providing the feed composition according to claim 29 to a site containing said at least one of fishes and shellfishes.

31. The feed composition of claim 1, wherein the feeding stimulator is selected from the group consisting of dimethylthetin, dimethyl-beta-propiothetin, carboxymethyldiethylsulfonium, carboxymethyldipropylsulfonium, carboxyethyldiethylsulfonium, carboxyethyldipropylsulfonium, carboxymethyldibutylsulfonium, carboxymethyldipentylsulfonium, carboxypropyldimethylsulfonium, carboxybutyldimethylsulfonium, carboxypentyldimethylsulfonium, carboxymethysulfonium, carboxymethyldiaminosulfonium, carboxymethyldimethoxysulfonium, carboxymethylmethylmercaptosulfonium and salts thereof.

32. A method of feeding at least one of fishes and shellfishes by providing the feed composition according to claim 31 to a site containing said at least one of fishes and shellfishes.

33. The feed composition of claim 1, wherein the feeding stimulator is dimethyl-$\beta$-propiothetin.

34. A method of feeding at least one of fishes and shellfishes by providing the feed composition according to claim 33 to a site containing said at least one of fishes and shellfishes.

* * * * *

UNITED STATES PATENT AND TRADEMARK OFFICE
CERTIFICATE OF CORRECTION

PATENT NO. : 5,139,791
DATED : August 18, 1992
INVENTOR(S) : NAKAJIMA et al

It is certified that error appears in the above-identified patent and that said Letters Patent is hereby corrected as shown below:

Column 22, line 62 (claim 1), change "an is" to read --n is--.

Column 23, line 1 (claim 1), change "analkyl" to read --an alkyl--.

Column 23, line 13 (claim 1), change "analkyl" to read --an alkyl--.

Column 23, line 36 (claim 2), change "r$_2$" to read --R$_2$--.

Column 23, lines 39-44 (claim 2), change Formula (II)

$$-(CH_2)_m-\underset{R_3}{CH}-(CH_2)_m-COOH\text{" to read}$$

$$-- -(CH_2)_{m1}-\underset{R_3}{CH}-(CH_2)_{m2}-COOH --.$$

Column 23, line 48 (claim 2), change "a an" to read --an--.

UNITED STATES PATENT AND TRADEMARK OFFICE
CERTIFICATE OF CORRECTION

PATENT NO. : 5,139,791
DATED : August 18, 1992
INVENTOR(S) : NAKAJIMA et al

It is certified that error appears in the above-identified patent and that said Letters Patent is hereby corrected as shown below:

Column 24, line 17 (claim 5), change "emrcaptomethyl-"
to read -- mercaptomethyl- --.

Column 26, line 18 (claim 31), change "carboxymethysul-"
to read -- carboxymethylsul- --.

Signed and Sealed this

Twenty-first Day of December, 1993

Attest:

BRUCE LEHMAN

Attesting Officer     Commissioner of Patents and Trademarks